United States Patent
Jochheim et al.

(10) Patent No.: US 10,554,404 B2
(45) Date of Patent: Feb. 4, 2020

(54) PROTECTION OF SOFTWARE MODELS

(71) Applicant: dSPACE digital signal processing and control engineering GmbH, Paderborn (DE)

(72) Inventors: Janek Jochheim, Paderborn (DE); Karsten Kruegel, Paderborn (DE); Johannes Bloemer, Paderborn (DE); Gennadij Liske, Herford (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 96 days.

(21) Appl. No.: 14/886,523

(22) Filed: Oct. 19, 2015

(65) Prior Publication Data

US 2016/0112195 A1    Apr. 21, 2016

Related U.S. Application Data

(60) Provisional application No. 62/066,119, filed on Oct. 20, 2014.

(51) Int. Cl.
| | |
|---|---|
| *H04L 9/14* | (2006.01) |
| *G06F 8/35* | (2018.01) |
| *H04L 9/00* | (2006.01) |
| *H04L 9/08* | (2006.01) |
| *H04L 9/30* | (2006.01) |

(52) U.S. Cl.
CPC .................. *H04L 9/14* (2013.01); *G06F 8/35* (2013.01); *H04L 9/007* (2013.01); *H04L 9/0816* (2013.01); *H04L 9/30* (2013.01)

(58) Field of Classification Search
CPC ......... H04L 9/14; H04L 9/007; H04L 9/0816; H04L 9/30; G06F 8/35; G06F 21/10
See application file for complete search history.

(56) References Cited

U.S. PATENT DOCUMENTS 5,917,912 A * 6/1999 Ginter .................... G06F 21/10
                                                                         348/E5.006
8,078,885 B2   12/2011 Jobmann
(Continued)

FOREIGN PATENT DOCUMENTS

CN         101084482 A        12/2007
CN         101727545 A         6/2010
(Continued)

OTHER PUBLICATIONS

NPL Search (Google Scholar) (Year: 2019).*
(Continued)

*Primary Examiner* — Mahfuzur Rahman
*Assistant Examiner* — Richard W Cruz-Franqui
(74) *Attorney, Agent, or Firm* — Muncy, Geissler, Olds & Lowe, P.C.

(57) ABSTRACT

An encryption method is provided that has a software model of a technical system, the model including software components is encrypted by a public key and a decryption structure, wherein the latter includes definitions of component groups of the software model. The decryption structure is integrated at least partially into the encrypted software model. Correspondingly, in a decryption method according to the invention, via a secret key that likewise comprises definitions of component groups, only the particular component groups are decrypted whose definitions the secret key includes in agreement with the definitions of the encrypted software model. The definitions of the secret key can be extended after the fact by a key extension, so that additional component groups can be decrypted with an extended secret key.

18 Claims, 6 Drawing Sheets

(56) References Cited

U.S. PATENT DOCUMENTS

| | | | |
|---|---|---|---|
| 8,275,995 B2 | 9/2012 | Jobmann | |
| 8,555,405 B2 | 10/2013 | Jeschke et al. | |
| 8,694,771 B2* | 4/2014 | Malek | H04L 9/3073 |
| | | | 713/155 |
| 8,850,385 B2* | 9/2014 | Ahlgren | G06F 9/468 |
| | | | 717/104 |
| 9,106,407 B2* | 8/2015 | Kipnis | H04L 9/085 |
| 9,209,974 B1* | 12/2015 | Akinyele | H04L 9/30 |
| 2003/0044018 A1* | 3/2003 | Tomlinson | G06F 21/10 |
| | | | 380/277 |
| 2004/0158788 A1* | 8/2004 | Kaszynski | G06F 17/5022 |
| | | | 714/741 |
| 2006/0064488 A1 | 3/2006 | Ebert | |
| 2006/0204003 A1* | 9/2006 | Takata | H04L 9/083 |
| | | | 380/30 |
| 2009/0013186 A1* | 1/2009 | Jeschke | G06F 21/10 |
| | | | 713/170 |
| 2010/0067705 A1* | 3/2010 | Boccon-Gibod | G06F 21/10 |
| | | | 380/285 |
| 2011/0276914 A1* | 11/2011 | Ahlgren | G06F 9/468 |
| | | | 715/771 |
| 2011/0320809 A1* | 12/2011 | Annendola | H04L 9/088 |
| | | | 713/158 |
| 2012/0144210 A1* | 6/2012 | Yacobi | H04L 9/0836 |
| | | | 713/193 |
| 2014/0143543 A1* | 5/2014 | Aikas | H04L 67/1097 |
| | | | 713/168 |
| 2016/0196452 A1* | 7/2016 | D'Souza | H04L 9/0894 |
| | | | 713/164 |
| 2016/0294551 A1* | 10/2016 | Ichikawa | H04L 9/14 |
| 2016/0330022 A1* | 11/2016 | Ito | H04L 9/0618 |

FOREIGN PATENT DOCUMENTS

| | | |
|---|---|---|
| CN | 101884188 A | 11/2010 |
| CN | 103258151 A | 8/2013 |
| DE | 10 2007 008 948 A1 | 9/2008 |

OTHER PUBLICATIONS

Ioannis Rouselakis, B.E., "Attribute-Based Encryption: Robust and Efficient Constructions," Dissertation for Univ. of Texas at Austin, pp. 1-260 (Aug. 2013).

Goyal et al., "Attribute-Based Encryption for Fine-Grained Access Control of Encrypted Data," pp. 1-28.

AUTOSAR Interfaces User Guide V. 1.3.0, R4.1, Rev 2, pp. 1-99 (Oct. 31, 2013).

AUTOSAR Virtual Function Bus, V3.2.0, R4.1, Rev 3, pp. 1-103 (Mar. 31, 2014).

AUTOSAR Requirements on Software Component Template V2.2.1, R4.1, Rev 2, pp. 1-49 (Sep. 4, 2013).

AUTOSAR Generic Structure Template V3.5.0, R4.1, Rev 3, pp. 1-393 (Mar. 31, 2014).

AUTOSAR Model Persistence Rules for XML, V2.7.0, R4.1, Rev 3, pp. 1-75 (Mar. 31, 2014).

Car 2 Car Communication Consortium Manifesto, pp. 1-94 (Aug. 28, 2007).

Brent Waters, "Ciphertext-Policy Attributed-Based Encryption: An Expressive, Efficient, and Provably Secure Realization," PKC 2011, LNCS 6571, pp. 53-70 (2011).

ECU Designing and Testing using National Instruments Products, http://www.ni.com, pp. 1-6 (Nov. 7, 2009).

Encrypt II European Network of Excellence in Cryptology II: Final Report on Main Computational Assuptions in Cryptography, pp. 1-65 (Nov. 11, 2013).

Brent Waters, "Functional Encryption: Beyond Public Key Cryptography," SRI International, pp. 1-37.

Brent Waters, "Functional Encryption: Origins and Recent Developments," PKC 2013, LNCS 7778, pp. 51-54 (2013).

Nikov et al., "New Monotone Span Programs from Old," pp. 1-17.

Karchmer et al., "On Span Programs," pp. 1-10.

Rouselakis et al., "Practical Constructions and New Proof Methods for Large Universe Attribute-Based Encryption," CCIS 13, Berlin, Germany (Nov. 4-8, 2013).

Katz et al., "Predicate Encryption Supporting Disjunctions, Polynominal Equations, and Inner Products," J. of Cryptology, vol. 26, pp. 191-224 (2013).

AUTOSAR Project Objectives, V3.2.6, R4.1, Rev 2, pp. 1-10 (Oct. 31, 2013).

Amos Beimel, Secure Schemes for Secret Sharing and Key Distribution, Thesis for Israel Institute of Technology, pp. 1-115 (Jun. 1996).

Extended European Search Report for European Application No. 15190334.1 dated Feb. 22, 2016 with English translation.

Office Action dated Sep. 27, 2018 by European Patent Office in corresponding application 15190334.1.

Chinese Office Action dated Nov. 5, 2019 in corresponding application 201510675496.7.

* cited by examiner

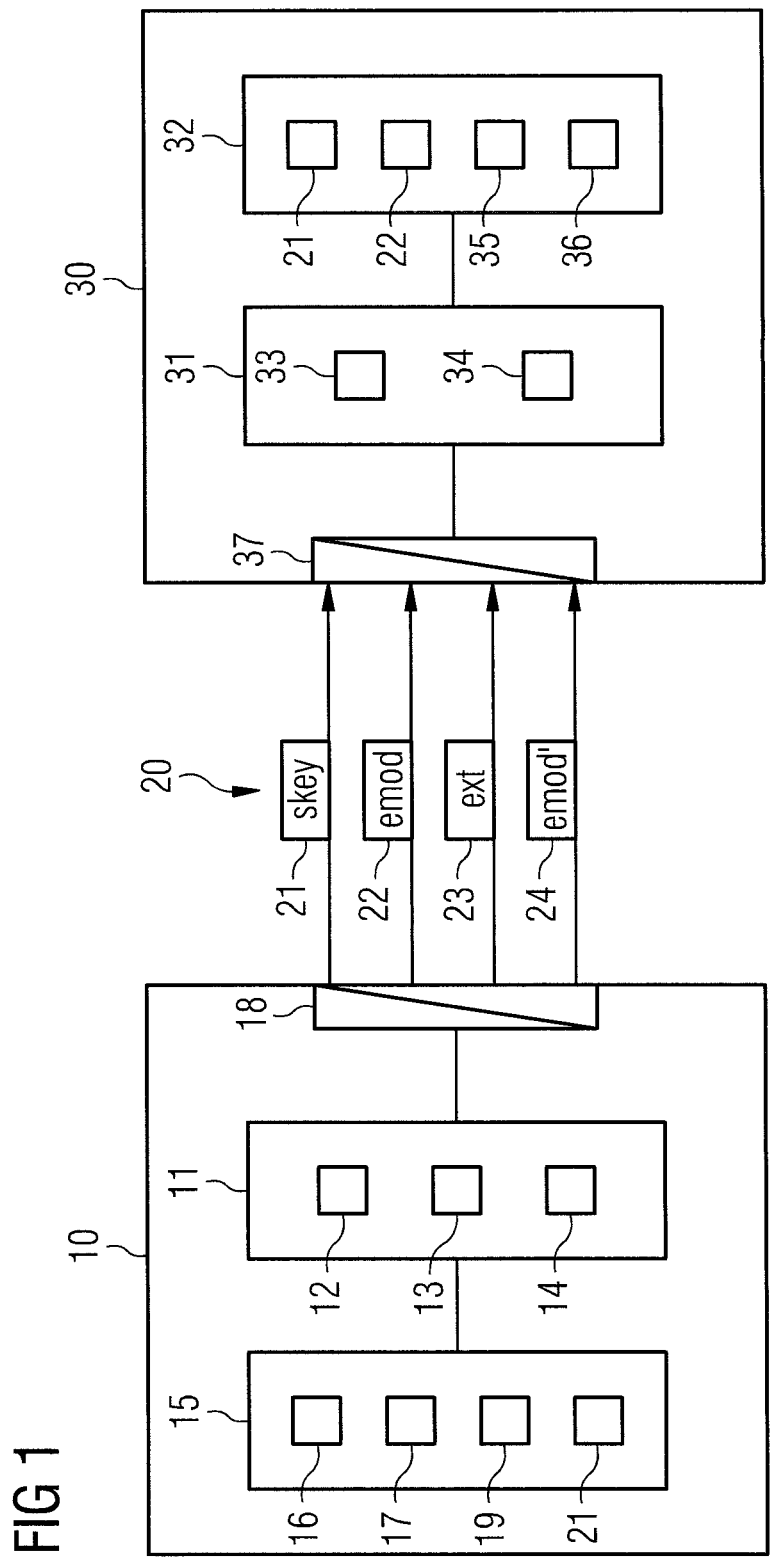

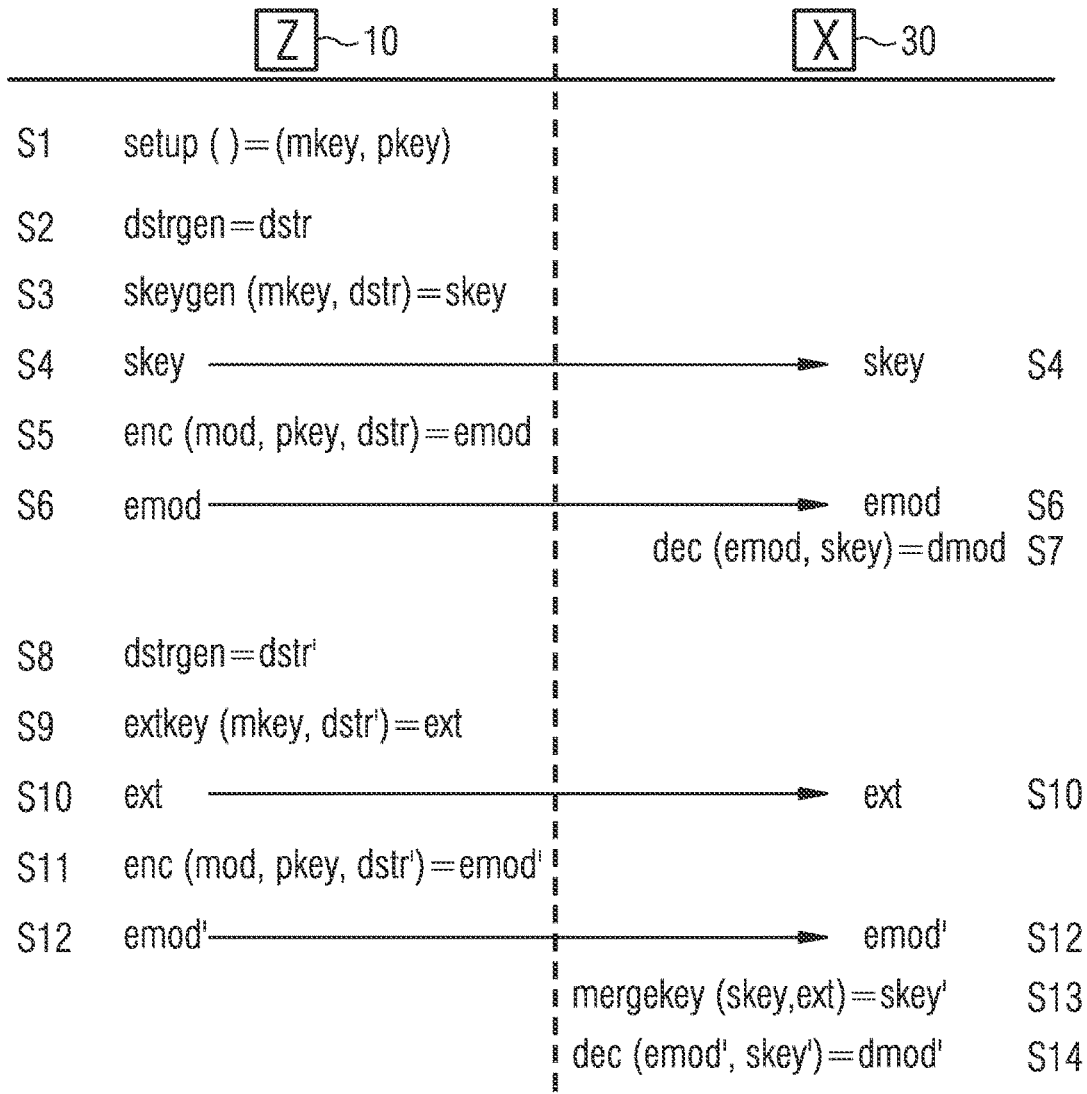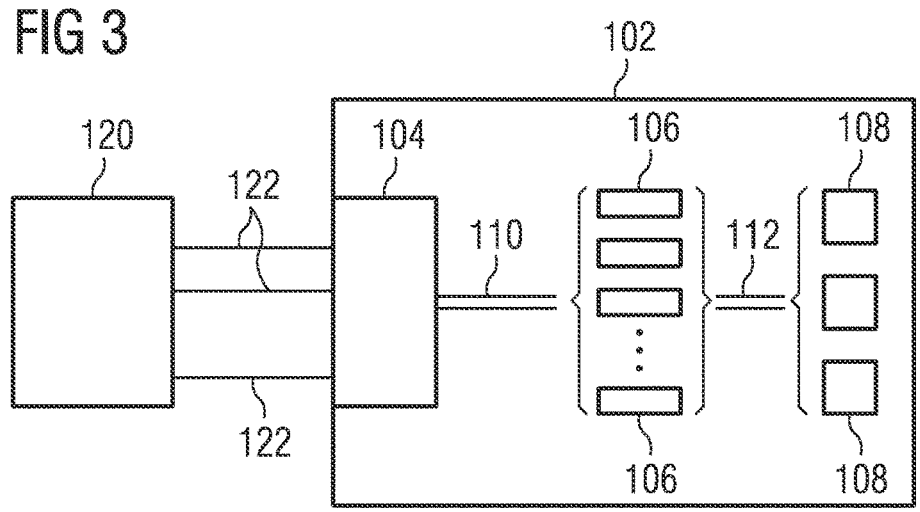

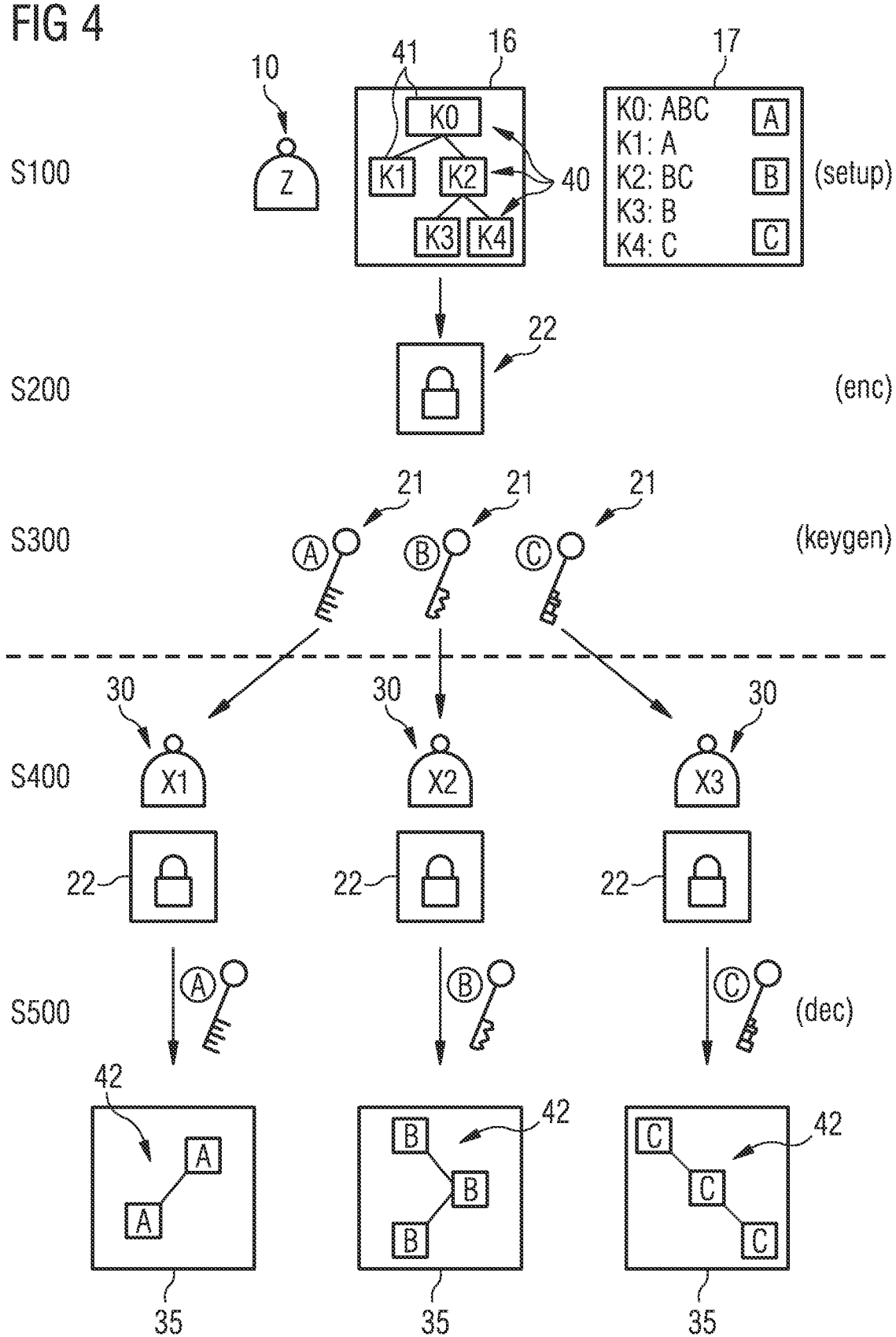

FIG 5a
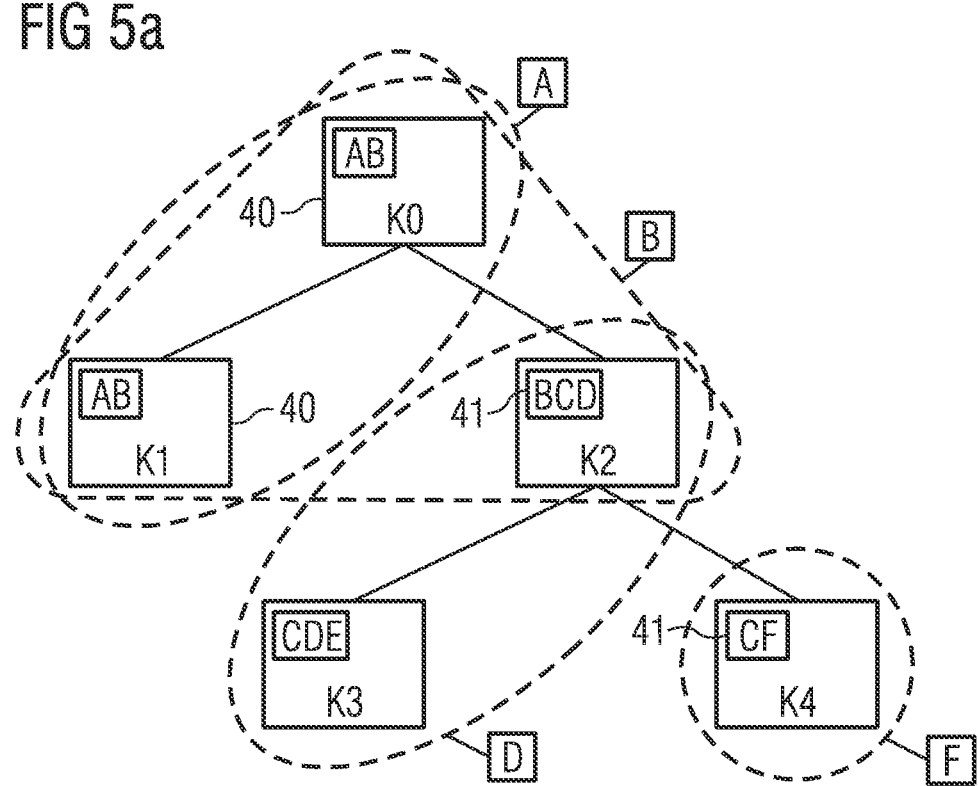
FIG 5b
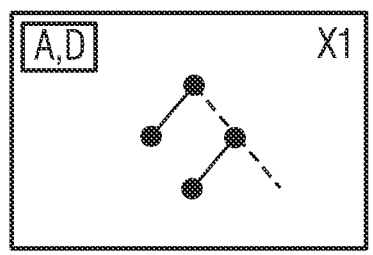
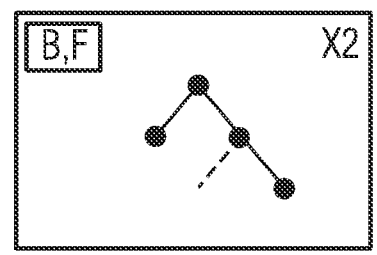
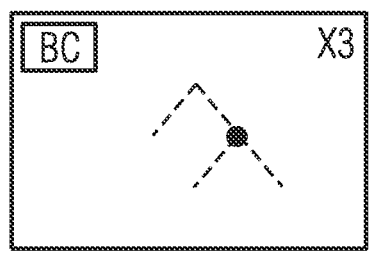
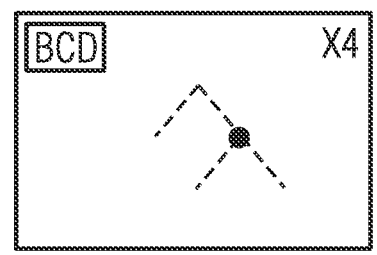

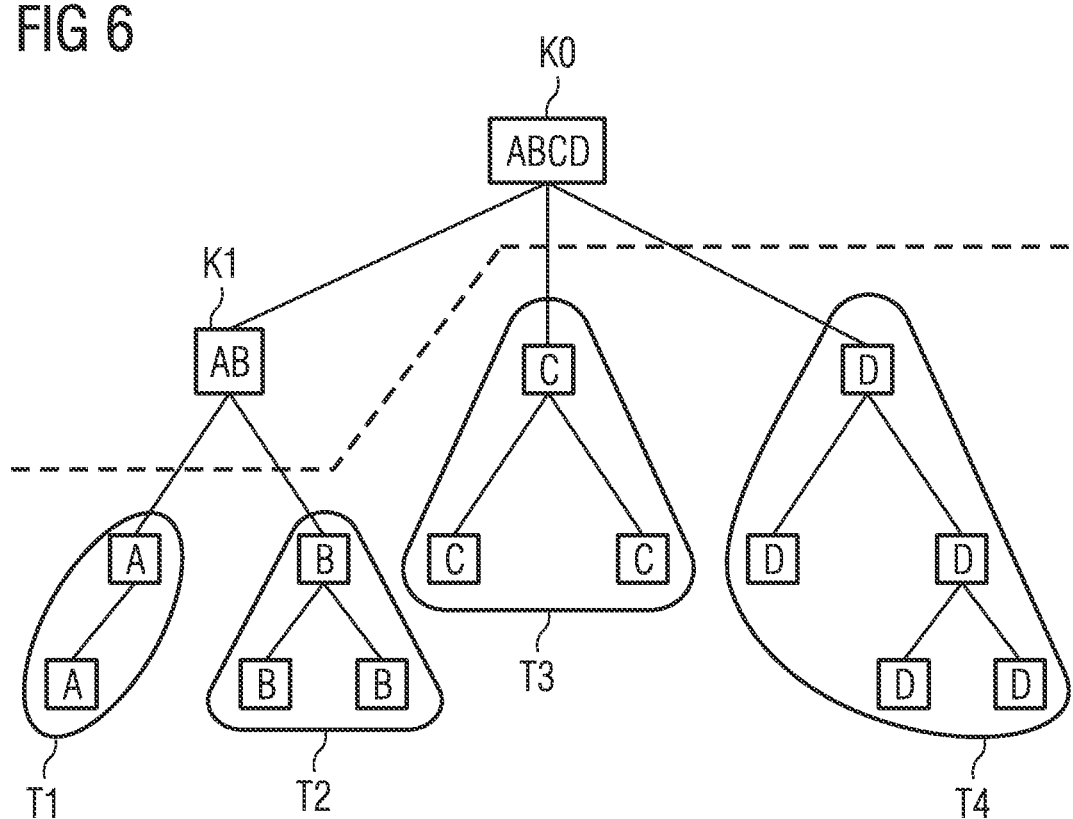

PROTECTION OF SOFTWARE MODELS

This nonprovisional application claims priority to U.S. Provisional Application No. 60/842,043, which was filed on Sep. 5, 2006, and is herein incorporated by reference.

BACKGROUND OF THE INVENTION

Field of the Invention

The present invention relates to the encryption and decryption of a software model of a technical system as well as a corresponding encryption unit and decryption unit. The invention also comprises an encrypted software model and an environment for the development of such a software model.

Description of the Background Art

The concept of the software model relates to the process of computer-assisted development, testing, and simulation of a real technical system or of parts of such a system within a development and simulation environment, for example in the form of control unit modeling or control unit architecture modeling, virtual control unit validation, HIL simulation ("Hardware-in-the-loop") or "Rapid Control Prototyping" (RCP). The software model here represents a prototype, present only in virtual form, of the relevant real technical system, and partially or fully reproduces its technical characteristics, parameters, states, and functions, as well as its interfaces and possibilities for interaction and communication with other software models or with real technical (sub-) systems within the development environment. Fundamentally speaking, any desired technical systems can be the subject of such a software model, wherein the development process can also encompass, at least in part, computer-assisted simulation, creation and testing of virtual and/or software-based prototypes, or other virtualized development steps. Within this technical context, the present invention relates in particular to virtual software models of control units, known as "Virtual Electronic Control Units" (V-ECU), which control or regulate other technical devices or systems, such as motor vehicle engines or the like.

The development environments of an HIL simulator and of an RCP test device each comprise a test device on which the software model of a virtual control unit is implemented in a manner predetermined by the test device. The software model here includes suitable input/output interfaces for connecting the modeled control unit to a device to be controlled and testing the control functionalities thereof. In Rapid Control Prototyping (RCP), a software model of the control unit to be tested, which is connected to the technical device to be controlled, is developed and tested. In an HIL simulation, in contrast, a software model of the technical device to be controlled is present that is connected to the real control unit to be tested. In both cases, a test device configured for testing the control unit is provided, wherein the control unit is tested as a model in one case (RCP) and as an externally connectable hardware prototype in the other case (HIL). In addition, however, the invention also concerns software models, which at least partially comprise both the virtual control unit and the device to be controlled, for example when neither the control unit nor the device to be controlled are completely present as a hardware prototype.

Software models of this nature comprise a plurality of software-provided functions, objects, modules, and/or components that use specific data structures depending on the chosen development environment, and interact with one another in complex ways and influence each other's behavior. Such software models are frequently worked on by different developers or developer teams at different sites, while a central instance, for example a development coordinator, project leader, or the like, coordinates the distributed development process, assigns development tasks to the developers or developer teams, and functions as the sender of task-related data sets to the developers using a suitable electronic communications infrastructure.

In this context, it is known in the case of asymmetric cryptography that a sender of a data set encrypts the data set using a public encryption key of the intended recipient, and the recipient can decrypt the encrypted data set with his corresponding secret decryption key. However, when asymmetric cryptography is used in a distributed development process, the problem arises that there is no way to encrypt individual software components or component groups within the complete software model separately or differently from other components or component groups of the same software model. Instead, the known asymmetric encryption only offers the possibility of manually extracting the relevant components or component groups from the software model in advance, which is to say essentially disassembling the software model, and separately encrypting the extracted components or component groups with the public keys of the individual developers. The central instance must possess and manage the public keys of all developers and developer teams in this context.

Quite apart from the enormous administrative effort of asymmetric cryptography, it is difficult for technical reasons to isolate specific software components or component groups from the software model and to provide only those components or component groups to the relevant developers. On the other hand, it is desirable to provide the complete software model to every developer, and to define the different responsibilities and authorizations via a special access regime.

SUMMARY OF THE INVENTION

It is therefore an object of the present invention to provide a protected, distributed development process in which the complete software model is present for every developer, but the developer only has access to the particular software components he is authorized to work with.

In the encryption method according to an embodiment of the invention, a central instance, such as the development coordinator or project leader in a distributed development process, first generates a cryptographic master key and a central, public encryption key, wherein the software model can be fully encrypted with the latter key. In addition, the central instance organizes the individual components of the software model in component groups, with different developers or developer teams being intended to have exclusive responsibility or authorization to work with each component group.

The term "developer" can also refer hereinafter to teams of multiple developers as long as they are jointly carrying out a development task. The term "component group" should be understood to mean a subset of the components of the software model, which can comprise one or more components. In particular, one component can also be contained in multiple component groups, which is to say the component groups are not disjoint.

Starting from such a grouping of the software components into one or more component groups, the central instance generates a decryption structure that provides the grouping in the form of a suitable data structure. The decryption structure comprises the definitions of the one or more component groups, and governs the encryption of the software model by the central instance on the one hand and the later decryption of the encrypted software model by the applicable authorized developers on the other hand. In addition to these definitions of component groups, the decryption structure also includes suitable addressing of the individual components of the software model, via an assignment of attributes to the components, on which basis components are addressed as groups and component groups can be defined. The decryption structure thus corresponds to a set of rules for encryption of the component groups within the complete software model according to a predefined syntax and semantics, and in this way provides a nuanced access regime that assigns the developers access rights to software components individually or in groups.

In a next step, the complete software model is encrypted via the central public key as specified by the decryption structure. Furthermore, the decryption structure is at least partially integrated into the encrypted software model so that the access regime, which the decryption structure specifies via definitions of component groups, can be taken into account during decryption. The at least partial integration of the decryption structure into the software model can pertain here to the attributes assigned to the components and/or to the definitions of the component groups based on these attributes. The assignments of attributes to components can be integrated into the software model, while the definitions of component groups based thereon, which is to say the information about the components to be decrypted together, are integrated into the secret key.

The components can be encrypted individually, but it is not necessary for all components to be encrypted. On the contrary, it can be useful to leave individual components unencrypted if they do not have to be protected. In this regard, the software model can also be only partially encrypted, so that the encrypted software model can comprise encrypted components on the one hand and unencrypted components on the other hand. It is not necessary for the unencrypted components to be taken into account by the decryption structure.

As a result of the at least partial integration of the decryption structure into the encrypted software model, encryption of the model takes place in such a manner that a component group defined in the decryption structure can only be decrypted by the particular developer in whose secret decryption key the definition of precisely this component group is integrated. Other component groups whose definition is not included in this secret key cannot be decrypted by the developer.

In this way, the invention allows the complete encryption of the entire software model in just one step on the one hand, and the selective decryption of individual component groups in accordance with a previously defined and flexible access regime on the other hand. There is no need either for manual disassembling of the software model in accordance with the respective access rights of the developers with the goal of separate, developer-dependent encryption of individual component groups, or for complex management and selective use of individual public keys of the developers. On the contrary, just one single public key is required for encryption, which minimizes management effort on the part of the central instance. The access regime is integrated directly into the encrypted software model as a decryption structure, and a central encryption key can be used. The encryption is thus independent of individual cryptographic encryption keys of the developers.

In order to ensure decryption of the encrypted software model according to the access regime of the decryption structure, the central instance uses the master key and the decryption structure to generate an individual, secret decryption key for each developer, with which only the component groups assigned to the developer by the decryption structure can be decrypted. Therefore, during the generation of the secret keys according to an exemplary embodiment, the particular definitions predetermined by the decryption structure of the particular component groups that the particular developer is authorized to decrypt are integrated into the relevant secret key. According to an alternative embodiment, the definitions of the component groups to be decrypted by a developer can also be integrated into the encrypted software model.

In the case, that the definitions of the component groups to be decrypted by a developer are integrated into his secret key, in the decryption method according to the invention a check is made for every encrypted component as to whether the secret key used includes a definition of a component group to be decrypted that includes the applicable component. Only then is the developer considered authorized, and only then is this component group decrypted.

The invention permits central creation and management by the central instance of an access regime in the form of the decryption structure and ensures that the access regime is taken into account during decryption of the software model. Thus, each developer can only decrypt the components of the fully or partially encrypted software model provided to him that belong to a component group that, according to the decryption structure, he is responsible for working with. The secret key does not correspond to a particular public key, but instead to the authorizations specified by the decryption structure. Furthermore, the invention makes it possible that the software model need only be centrally encrypted once, and can then be delivered to multiple developers without security restrictions. In this system, parts of the software model, which is to say components and component groups, can be provided with different authorizations without individual manipulation. Just like the central instance, the developers also need only one key in order to use the method according to the invention.

The result of the encryption method according to the invention, or the object of application of the decryption method according to the invention, is a cipher text in the form of an electronic data set that comprises the encrypted software model and at least part of the decryption structure. Even though the electronic data set includes the complete, encrypted software model, the software components or the component groups defined by the decryption structure can be encrypted therein individually and independently of other components or component groups. An encrypted component group can comprises components that in turn are individually encrypted, independently of other components. The encrypted component groups can be decrypted through the use of a secret key that comprises definitions that match corresponding definitions of the decryption structure in the electronic data set.

In connection with the present invention, the term "component group" should be understood to mean a subset of the particular components of the software model that have certain functional, organizational, or other technical dependencies on one another, and which therefore should always be decrypted together by a developer to make it possible to work with them in a useful manner. The corresponding definitions of such component groups can either be integrated into the decryption structure or into the secret key of the developer in question, or can even be integrated into both the decryption structure and the secret key.

Accordingly, the definition of the component groups takes place in two steps, namely such that the central instance first can define the component groups based on the said dependencies, and then can assign attributes to the individual components such that the components of each defined component group can be addressed in groups or described jointly. In the simplest case, this can be achieved in that the components of a component group carry one or more matching attributes that the components of other component groups do not have. The attributes can be assigned in such a way that the components of a component group can be combined using Boolean operators into propositional expressions such that only the desired components satisfy the propositional expressions.

It is also possible to carry out the definition of the component groups in the reverse order, namely in that the central instance first assigns predefined attributes to the components and after that defines component groups in the decryption structure based on the attributes of the desired components. In this variant as well, the component groups can be defined via propositional expressions that are satisfied by the attributes of the desired components.

The attributes can relate to characteristics of the developers or of the software components, or can be purely abstract features that serve solely to distinguish the components. The attributes can indicate, for example, tasks, responsibilities or the role of the developer in the development process, or functions, security levels or authorship of components, or merely address single or multiple components with no additional significance. For example, each component can also be assigned an individual attribute of its own.

In this way, each component can be assigned at least one attribute, but also multiple attributes. The decryption structure is constructed using the attributed components as a starting point, as a list in which each list entry defines a component group by referring to specific attributes. A component group defined in such a way can comprise, for example, all components that carry at least one of the attributes combined in the associated entry. For example, the list entry [ABC] defines with an OR rule the group of all components that have either the attribute A or the attribute B or the attribute C. Alternatively, a component group can also be defined by an AND rule such that it comprises the particular components of the software model that have all the attributes of the list entry in question. The list entry [ABC] thus then defines the group of all components that carry the attributes A and B and C. Fundamentally, it is possible to construct any desired propositional expressions that use other Boolean operators as well, such as NOT, XOR, NOR, NAND or the like, for the definition of component groups.

Accordingly, based on the decryption structure, the central instance integrates into a secret key at least one list entry defining the particular component group that the secret key is intended to be able to decrypt. In other words, the attributes that define the applicable component group within the decryption structure are integrated into the secret key.

If the desire is for multiple component groups to be decrypted with one secret key, then the applicable list entry can be syntactically structured accordingly. Using the OR rule, the list entry [AB, CD] then defines two component groups, namely the group of those components that carry either the attribute A or the attribute B, and the group of those components that carry either the attribute C or the attribute D. Alternatively, multiple component groups that are to be decrypted with one secret key can also be defined by multiple list entries, which are then jointly integrated into the secret key. The list entries can be any desired propositional expressions that link the attributes using Boolean operators, as long as this is useful for the definition of a component group.

In general, the encryption and decryption of software models according to the invention therefore requires an attribute assignment on the one hand, which is to say an association of attributes with the individual components, and on the other hand requires the definition of the component groups as components that can be decrypted jointly. The latter is achieved by specifying individual attributes, attribute combinations, or suitably linked attributes, for example in the form of propositional expressions using Boolean operators. Both the attribute assignment and the definition of component groups are recorded in the decryption structure, which constitutes the central data structure of the invention.

In this context, there are two fundamental variants of the integration of these two structures into the encrypted software model and the secret key. In the exemplary embodiment, which is also primarily described here, the attribution is integrated into the software model and the definitions of the component groups are integrated into the secret key based on the attributes. This variant is also referred to as key-policy (KP). In the variant referred to as cipher text-policy (CP) the reverse is the case, which is to say the attribution is integrated into the secret key, and the definitions of the component groups, associated in each case with the secret keys with which the corresponding component groups are intended to be decryptable, are integrated into the encrypted software model. Both the KP variant and the CP variant are included in the present invention and can be implemented with the invention and via the invention.

During decryption of an encrypted software model, two checks are made accordingly. Firstly a check is made as to whether the attributes integrated into the secret key correspond to a list entry of the decryption structure partially integrated into the encrypted software model. If this is the case, it is guaranteed that the secret key is authorized to decrypt a component group defined by the decryption structure. In another step, a check is then made for each encrypted component of the encrypted software model, using the attributes thereof, whether this component is a member of the component group that is decryptable by the secret key. If this is the case, the component is decrypted.

It is thus a fundamental advantage of the invention that the software model is encrypted completely or partially, but can be decrypted by component depending on the authorization of the relevant key. This not only avoids unnecessary management effort, but also efficaciously prevents unauthorized software developers from being able to access software components.

The software components can have specific functional, organizational, or other relationships with other components within the software model. The attributes partially or fully can reproduce such relationships. If the relationships of the components form, e.g., a graph with the components as nodes of the graph, for instance a directed graph, as for example a hierarchical structure or tree structure, the attributes can reproduce this graph structure in that components in a specific relationship are assigned the same attribute in each case.

Typical relationships between software components oftentimes simply result from a data structure predetermined by the development environment in which the software model or the virtual technical system is being developed. Options for development environments for the control units mentioned at the outset and for the systems they control or regulate include AUTOSAR-compliant architecture modeling tools or a model-based development environment, for example a SIMULINK/MATLAB environment for the development of open-loop and closed-loop control algorithms of the control unit. The invention can be applied to non-AUTOSAR architectures as well, however. In such development environments for the modeling and simulation of technical systems, the software components of the model are represented by nodes of a network or graph, while the relationships, technical dependencies, or signal paths between these components are modeled by directed connections between the nodes.

For example, such a relationship can concern software dependencies, for instance when one component uses functions or libraries from one or more higher-level components, or can also concern technical dependencies, for example if directed signal paths that are needed as input parameters exist between the components. The same attribute can then be assigned to such mutually dependent components. In contrast, with a hierarchical tree structure it is possible, for example, to assign different attributes to all leaves of the tree and to assign to each higher-level component all the attributes of all the leaves possessed by the subtree defined by the higher-level component. In the case of a hierarchical component structure, at least one common attribute can be assigned to each component and the component a level above it. In this way, as another advantage of the invention, a necessary prerequisite for the usability of the decrypted software model by the authorized developers is guaranteed, namely that functional, organizational, software, or other dependencies and relationships between the components are taken into account via suitable entries in the decryption structure during the creation of component groups.

This manner of attribution of software components makes the creation of useful component groups simpler or indeed possible at all. The decryption structure can be constructed such that a component group also includes the higher-level software components for each software component in this group. In this way, component groups are formed that are technically or organizationally useful and that reflect the relationships between the components. If necessary, the decryption structure can also be constructed such that a component group also includes the software components on lower hierarchy levels for each software component therein, which is to say the subtree defined by this component.

There can be components within the software model that together constitute an autonomous or executable or separately functioning or technically useful part of the software model. Such an autonomous or executable part of the software model represents, for example, a sub-model that implements certain functions of the modeled technical system largely without interaction with other parts of the model, that can run autonomously within the computer-assisted development environment, or that models a technically useful subunit of the technical system, for example an interchangeable module, a standard element, or the like. This is why the decryption structure or its list entries can be structured such that the components of such an autonomously executable sub-model are combined in one component group.

Likewise, there may also be trivial and/or essential software components within the software model. Examples of trivial components are components that have no technical equivalent in the modeled system but instead are present merely for structural reasons, for example to put the non-trivial components in a usefully organized tree structure or to combine technically related components. In contrast, essential components model functions or aspects of the modeled system that are sufficiently important that they are needed for working with multiple submodels or multiple component groups. The attributes of the software model or the definitions of the component groups based thereon take into account trivial and/or essential components in such a way that they can be contained in each component group or at least in each component group that is located below the applicable trivial and/or essential components in the tree structure.

In an embodiment of the invention, the secret keys of the developers are extensible. This means that an already issued secret key that permits the applicable developer to decrypt specific component groups of the encrypted software model can be modified via a key extension such that additional component groups can be decrypted with the extended secret key.

In the distributed development process described, this is always useful when, for example, the central instance wishes to give additional responsibilities to the developer, or when the responsibility for a specific component group is to be transferred from one developer to another. For example, it may be necessary for a developer to work with a new component group, or it may not become apparent until after the generation of a secret key that the developer should be responsible for additional component groups.

In this context, the central instance generates, based on the already existing attribution of the software model, an additional decryption structure that defines at least one additional component group of the software model. Then the central instance uses the master key and the additional decryption structure to generate a key extension for the secret key that, based on the existing attribution of the components, includes a definition of the additional component group that should in future be decryptable with the correspondingly extended secret key. During generation of the key extension, the central instance uses an information item regarding the secret key to be extended, for example the identifier explained further below, and can integrate this information into the key extension.

The process of generating the additional decryption structure can be similar to, or even identical to, the process of generating the original decryption structure and can take place on the basis thereof, for example in that the additional decryption structure is generated from the original decryption structure by adaptation or modification, in that the attribution can be adopted from the original decryption structure and is augmented with the definition of the at least one additional component group. The additional decryption structure can be generated independently of the original decryption structure, however. In like manner, the process of generating the key extension from the additional decryption structure can be similar to, or even identical to, the process of generating the secret key from the original decryption structure.

The definition of the additional component group in the additional decryption structure and key extension can take place via the existing attributes of the components that are combined into the additional component group. In order to define the additional component group, however, at least one additional attribute can be used that was not previously used alone or in combination with other attributes in the definitions of the secret key that is to be extended. The at least one additional attribute is then suitably integrated into the key extension.

The extended secret key can be generated by the particular developer whose secret key is to be extended. In this process, the key extension is integrated into the secret key to be extended or is appropriately linked or merged therewith. The definition of the at least one additional component group specified by the key extension, which is to say the attributes and propositional expressions that define this additional component group, can be integrated into the secret key or into the definitions of the secret key so that in future the additional component group can also be decrypted with the extended secret key. The definitions of the extended secret key thus also include the definitions and attributes of both the secret key and the key extension.

If the secret key that is to be extended includes, e.g., the definition [AB], which defines the group of all components that have at least one of the attributes A and B, the additional decryption structure and the key extension resulting therefrom can include, for example, the additional definition [BC], which defines the group of all components that have at least one of the attributes B and C. the secret key that is extended by the key extension then permits the relevant developer to decrypt the component group [BC] in addition to the component group [AB]. The corresponding list entry [AB, BC] of the extended secret key then defines both component groups. The fact that the two component groups overlap with regard to the attribute B does not present an obstacle, since the present invention does not require the component groups to be defined free from overlaps.

During the decryption of the encrypted software model via the extended secret key, exactly as during decryption via the original, not-yet extended secret key, an additional check is made for each component of the encrypted software model as to whether this component is part of the additional component group that is now decryptable by the extended secret key. Only if this is the case is the additional component group also decrypted.

What is important in this regard is that the decryption structure of the encrypted software model already includes a definition of the additional component group that is additionally to be decrypted with the extended secret key. In the event that the definition of the additional components is already provided in the decryption structure and is present in the encrypted software model, for example because the secret key of another developer could already decrypt this component group, the software model need not be encrypted anew. However, in the event that the additional component group was newly defined via the additional decryption structure, which is to say if the definition of the additional component group was not contained in the original decryption structure, then either the software model must be encrypted anew with a correspondingly extended decryption structure so that the additional component group can be decrypted with the extended secret key, or else the key extension defines a component group that cannot be derived from the original decryption structure, and thus does not represent a permissible extension of the secret key. Both variants can be technically useful and may be desired by the central instance. In the case of the first variant mentioned, which is to say in the case of new encryption of the software model with the extended decryption structure, either the additional decryption structure is integrated into the original decryption structure, or both the original decryption structure and the additional decryption structure are taken into account during encryption of the software model.

Alternatively, instead of a separate, additional decryption structure, an extended decryption structure can also be generated that comprises both the definitions of the component groups that were previously already decryptable and the definition of the additional component group. This extended decryption structure is then used to generate the key extension and encrypt the software model anew.

The key extension with the definition of the additional component group is generated such that the additional component group can be decrypted only by the extended secret key, thus, specifically, cannot be decrypted by the key extension alone. The key extension differs from a secret key in construction, structure, or by a separate distinguishing feature in such a manner that it can be recognized as such and distinguished from a secret key during the decryption of the encrypted software model. This distinction can be accomplished via a special structure of the key extension, for example in that the syntax of the key extension differs from that of a secret key. Alternatively, a specific distinguishing feature can be used that is additionally present in the key extension or is absent relative to the secret key.

The original secret key and the key extension can each include an identifier. The identifier, which is integrated into the secret key and the key extension during the generation thereof, can be a random number, or can even carry information about the relevant developer or the secret key, for example in the form of a hash value. The identifier can also have a more complex structure and encode additional information, for example the definition of the additional component group as well.

In order to ensure that the additional component group can be decrypted only by the extended secret key, a check is made as to whether the identifiers of the secret key and of the key extension correspond to one another. On the one hand, this check can take place during extension of the secret key with the key extension, for example in that the extended secret key is only formed if the identifiers correspond. If the identifiers do not correspond, the extended secret key is thus not generated at all in this variant.

The extended secret key can also be formed independently of a correspondence of the identifiers, and the check for correspondence does not take place until the extended secret key is used. In this variant, therefore, the two identifiers are adopted unchecked in the extended secret key and the encrypted software model is only decrypted if both identifiers correspond. The identifiers of the extended secret key can be checked for correspondence only when the additional component group is to be decrypted. The particular component groups that it was already to be possible to decrypt via the original, non-extended secret key, can also be decrypted without limitation by the extended secret key as well, even when the identifier of the key extension and the identifier of the secret key do not correspond to one another. The additional component group is not decrypted, however, if the identifiers fail to match.

In the method according to the invention, the order of execution of the described steps is not restricted to the order in which they are described. Instead, the invention comprises all technically useful orders of execution and combinations of steps that accomplish the purpose of the invention.

The present invention also comprises an encryption unit, that can be implemented as a software solution, that makes the encryption method according to the invention available to the central instance, for example in the form of software modules, programs, or the like. In particular, the encryption unit comprises programs and corresponding user interfaces for generating the master key and the associated public key (setup), for generating the decryption structure and the individual secret keys (keygen), for generating the additional decryption structure and the relevant key extensions (extkey), and for encrypting the software model (enc). The encryption unit can be designed as separate software for implementing the cryptographic method according to the invention, or can be integrated into a development environment, within which the software model is developed and worked with.

In addition, the present invention also comprises a decryption unit, that can be implemented as a software solution that provides the decryption method according to the invention to the developers, for example in the form of software modules, programs, or the like. In particular, the decryption unit comprises programs and corresponding user interfaces for decrypting (dec) the encrypted software model with the secret key or extended secret key. The decryption unit can be designed as separate software for implementing the cryptographic method according to the invention, or can be integrated into a development environment, within which the software model is developed and worked with.

Further scope of applicability of the present invention will become apparent from the detailed description given hereinafter. However, it should be understood that the detailed description and specific examples, while indicating exemplary embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is a block diagram of devices according to the invention;

FIG. 2 illustrates the steps of the method according to the invention in schematic form;

FIG. 3 is a block diagram of an environment for testing a technical system in the form of a software model;

FIG. 4 illustrates the steps of the method according to the invention in schematic form for an exemplary attribute assignment of the software model;

FIGS. 5a and 5b are depictions of an exemplary software model with component groups and attributes;

FIG. 6 illustrates an exemplary software model with trivial software components.

DETAILED DESCRIPTION

Figure 7:
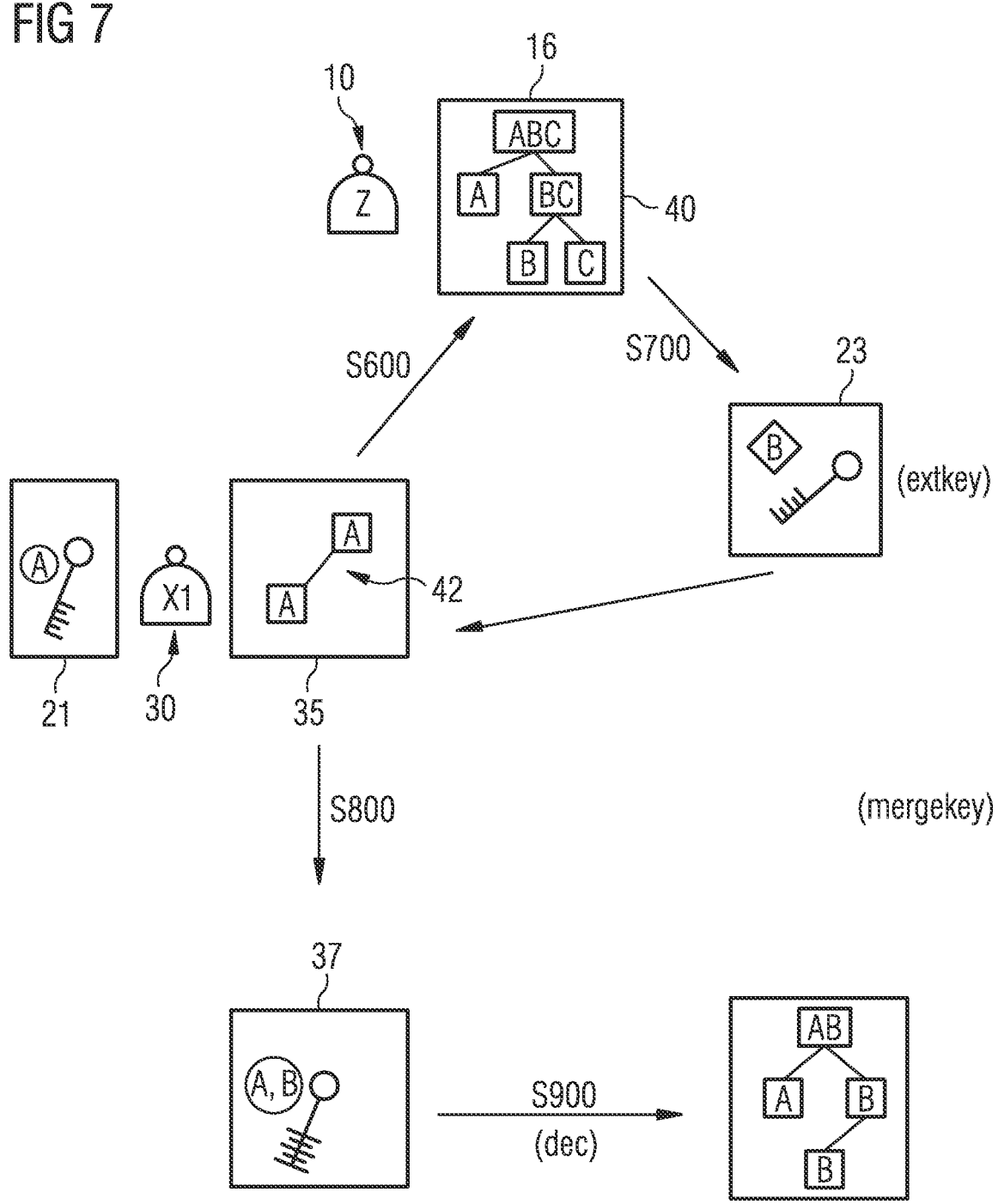
FIG. 7 illustrates the steps of the method for generating and using a key extension in schematic form.

The exemplary embodiments of the invention described below permit the secure distributed development of a software model of a technical system via a special asymmetric encryption and decryption of the software components of the software model. The invention is fundamentally suitable for any desired component-based software models, regardless of the specific programming languages and data structures used, the development environment, or other implementation of the software model. The invention is likewise not limited to the modeling of specific technical systems. Against this background, the invention is described below by way of example using virtual control units ("Virtual Electronic Control Unit;" V-ECU) such as may be developed and tested with the VEOS® or SCALEXIO® environments from dSPACE GmbH, Paderborn, Germany, for example.

Such software models are implemented within the development environment employed, for example as SIMU-LINK- or AUTOSAR-compliant models in the form of hierarchically organized, multi-component software structures. The invention is not limited to this exemplary scenario, however, but instead also relates to other suitable development and simulation environments and software and hardware architectures, in particular including non-AUTOSAR architectures, as well as any desired software structures, including non-hierarchical ones, as long as they are organized by component and can be represented as a graph. The software models are described within the chosen development environment via a suitable description language, which can be proprietary or can correspond to a software standard, for example XML-based languages or other common description and markup languages.

The schematic scenario in FIG. 1 shows a central instance 10 and one of several possible developer workstations 30 on which a software model 16 of a technical system, for example a virtual control unit, is jointly developed. In this context, the term "central instance" is hereinafter to be understood based on context to mean either the technical device labeled with reference number 10 in FIG. 1 or a human development coordinator who operates this device. For the sake of simplicity, the developer workstation 30, which is to say the hardware and software implementation of a workstation of a human developer, is also simply referred to below as "developer." Depending on context, the term "developer" can also refer to the human developer who uses the developer workstation 30.

In FIG. 1, the central instance 10 carries out the coordination of the distributed development process and assigns development tasks to the developers 30, each of whom should have exclusive access to specific parts of the software model 16, for example to the component groups 42 described in connection with the other figures. The software model 16 of the virtual control unit generally contains sensitive data and information, in particular source code, script code, object code, or other program elements, for example concerning the technical configuration of the modeled technical system or concerning algorithms, functions, or routines of the modeled system. These sensitive data are disclosed only to specific developers 30 and it should not be possible for other developers 30 to view or manipulate them.

The arrangement in FIG. 1 and the method from FIG. 2 implemented with this arrangement make the distributed development process possible. The central instance 10 determines what access rights and privileges individual developers 30 have here. To this end, the software model 16 is cryptographically secured such that it can be distributed to all developers 30 equally, but the developers 30 nevertheless only have the access that is permitted by the central instance 10 to specific parts of the software model 16, for example to specific component groups 42.

The central instance 10 is operated by a human development coordinator and comprises various devices and modules provided in hardware and software. In particular, the central instance 10 comprises an encryption unit 11, which can be implemented as a separate computer or as an integrated component of a work environment of the development coordinator. The encryption unit 11 comprises multiple software modules, for example a SETUP module 12 to initialize the method according to the invention, a KEYGEN module 13 to generate cryptographic keys, and an ENC module 14 to cryptographically encrypt the software model 16. Relevant data are stored in a memory 15, for example the unencrypted software model 16 and a decryption structure 17. The memory 15 can also store additional data that is generated or used in conjunction with the method according to the invention, for example a public key 19 (pkey) or data that are sent through a telecommunications channel 20 to the developers 30, namely secret keys 21 (skey), encrypted software models 22 (emod) and 24 (emod'), or key extensions 23 (ext), for example.

For communication with the developers 30, the central instance 10 includes a communications interface 18 that corresponds to a communications interface 37 of the developer workstation 30. The data 21, 22, 23, 24 are transmitted in a secured manner through the telecommunications channel 20. For the software models 22, 24 this is true in any case even for a telecommunications channel 20 that is not separately secured, because they are encrypted according to the invention prior to transmission. The key extension 23 as well can in principle be transmitted through an unsecured channel 20, because it is worthless to an attacker without the associated secret key 21. It is only the secret key 21 that must of necessity be transmitted through a secured channel 20 in order to prevent interception attacks and ensure the integrity of the method as a whole.

The developers 30 are in data communication with the central instance 10 through the communications interface 37. A developer workstation 30 comprises, in particular, a decryption unit 31, which can be present in the form of a separate computer, for example, or be integrated into a development environment. The encryption unit 31 here comprises multiple modules implemented in software, in particular a DEC module 33 for decrypting encrypted software models 22, 24, and a MERGE module 34, whose function is described below. In addition, a developer workstation 30 also includes a memory 32, in which relevant data are stored, for example the encrypted software model 22 (emod), the decrypted software model 35 (dmod), or the secret keys 21 (skey) and 37 (skey'). In addition, other data can also be stored in the memory 32 as needed, for example the encrypted software model 24 (emod'), the decrypted software model 36 (dmod'), or the key extension 23 (ext).

The modules 12, 13, 14, and 33 implement four central methods or processes with which a special embodiment of the invention is implemented in which the access rights of the developers 30 are initially defined by the central instance 10. In an exemplary embodiment, the module 34 allows the extension of the access rights of the developer 30 or of his secret key 21, even after the initial encryption process has been concluded by the central instance 10.

The steps S1 to S7 in FIG. 2 illustrate the basic embodiment of the encryption and decryption of an unencrypted software model 16, while the steps S8 to S14 in FIG. 2 concern the exemplary embodiment of the extension of the access rights initially granted to the developer 30. Correspondingly, FIG. 4 again concerns the basic embodiment of the encryption and decryption, while FIG. 7 concerns the extension of the access rights.

The steps S1 to S6 and S8 to S12 in FIG. 2 are carried out by the central instance 10 (Z), while the steps S4, S6, S7, S10 and S12 to S14 are carried out by the developers 30 (X). The central instance 10 functions here as a key generator and is located in the IT or development department of a software company, for example. Via the SETUP module 12 in step S1, the central instance carries out an initialization of the method according to the invention in which a secret master key (mkey) and a central public key 19 (pkey) are generated [setup( )=(mkey, pkey)] in one cohesive step. Alternatively, these two basic keys of the method according to the invention can also be generated individually during the initialization, for example through separate routines [mkeygen=mkey; pkeygen=pkey]. It is likewise possible that only a central management key, which combines the functions of the master key and the central public key 19, is produced during the initialization.

The master key functions as the central secret key of the central instance 10 for generating all other secret keys and relevant data structures. The public key 19 represents the central encryption key of the central instance 10. In this regard it can remain at the central instance 10, but can also be passed on to the developers 30 if they are also intended to be able to encrypt within the framework of the distributed software development.

In addition, the public key 19 can also be used as a decryption key in accordance with conventional asymmetric cryptography to decrypt encrypted data that have been encrypted with corresponding secret keys 21.

To encrypt the software model 16 and assign the desired access rights to the developers 30, a decryption structure 17 (dstr) is generated [dstrgen=dstr] in step S2. The decryption structure 17 is generated when a developer 30 requests an individualized secret key 21 or when a secret key 21 is to be provided to the developer 30, for example. It can be implemented by any suitable data structure desired, although in conjunction with the exemplary embodiment described it includes firstly of an attribution, which is to say an assignment of attributes 41 to the individual components 40 of the software model 16, and secondly of a list, each of whose list entries defines the access rights to specific parts of an encrypted software model 22 based on the assigned attributes 41. The list entries have either single or multiple attributes 41 combined via Boolean operators. In this way, the list entries define which parts of the software model 16 the applicable developer 30 can decrypt with his individual secret key 21. The decryption structure 17 takes into account the component-like structure of the software model 16 and permits access to a subset of the components 40 or one or more component groups 42 of the software model 16 as a function of the attributes 41 that were assigned to the components 40 by the attribution.

During generation of an individual secret key 21 (skey) in step S3, the decryption or access rights provided by the decryption structure 17 are integrated [skeygen(dstr)=skey] into the key. Thus it is useful, for example, that a developer 30—for example an employee of a firm working with the software company that operates the central instance 10—can only access or decrypt the particular components 40 or component groups 42 of the software model 16 that correspond to his function, his technical department, or his scope of duties.

Thus, for each developer 30 involved in the development process, in step S3 a separate, individual secret key 21 is generated that is different from the secret keys of other developers. In this process, firstly the master key (mkey) is taken into account, and secondly the access rights from the decryption structure 17 are linked with or integrated into the secret key 21 of the developer 30 in question.

In step S4, the generated secret key 21 is transmitted by the central instance 10 to the applicable developer 30 through the communications channel 20 in a cryptographically secured manner. To this end, for example, the secret key 21 is encrypted with a public key of the developer 30 that is not identical to the public key of the central instance according to the invention, and is decrypted again by the developer 30 with a corresponding secret key that in turn is not identical to the secret key 21 according to the invention. However, symmetric methods can also be used here as long as the key exchange takes place in a secured manner. Alternatively, the secret key 21 can also be delivered to the developer 30 in another secure way, for example by mail or in person.

In step S5 the software model 16 is encrypted [enc(mod, pkey, dstr)=emod] via the central public key 19. In so doing, the attribution from the decryption structure 17 (dstr), which is to say the association of attributes 41 with the components 40 of the underlying software model 16, is integrated into the encrypted software model 22 (emod) that is generated, so that the access rights of the different developers 30 that are integrated into the applicable secret key 21 can later be checked using the encrypted software model 22 (see step S7).

In step S6, the encrypted software model 22 (emod) is transmitted by the central instance 10 to all developers 30, and in step S7 the encrypted software model 22 is decrypted [dec(emod, skey)=dmod] by a developer 30 with the aid of the DEC module 33 and the previously received, individual secret key 21. In addition, the public key 21 (pkey) can also be used in the decryption step S7 as long as this key has been transmitted to the developers 30 by the central instance 10, for example as part of the transmission step S4.

The decrypted software model 35 (dmod) that results in step S7 is not identical here to the original, unencrypted software model 16 (mod), because the decrypted software model 35 only has the particular components 40 and component groups 42 of the software model 16 in decrypted form that were decrypted via the individual secret key 21 according to the decryption structure 17. All other components 40 and component groups 42 of the decrypted software model 35 remain encrypted and are not subject to access by the developer 30.

In the decryption step S7, the DEC module 33 uses the attribution integrated into the encrypted software model 22 in step S5 to check which component groups 42 of the encrypted software model 22 are specified by the list entries integrated in the secret key 21 in step S3. The applicable components 40 and component groups 42 are decrypted and the decrypted software model 36 is generated only if the access rights granted to the secret key 21 match the access rights that are stored in the encrypted software model 22 for this key 21.

During generation of the decryption structure 17 (dstr) in step S2, a common decryption structure 17 for all developers 30 is generated that defines the access rights of all developers 30. In step S5 the attribution is integrated into the encrypted software model 22, and in step S3 the particular part of the common decryption structure 17 that concerns the access rights of the developer 30 whose secret key 21 is being generated is incorporated in the secret key 21. Alternatively, however, it is also possible for a separate, individual decryption structure 17, which only defines the particular components 40 and component groups 42 that the developer 30 in question is supposed to be able to decrypt, to be generated for each developer 30. The encrypted software model in step S5, however, is generated such that it concerns the access rights of all secret keys 21 so that it can be provided identically to all developers 30.

The method from steps S1 to S7 is based on the approach that all the access rights required are initially stored in the decryption structure 17 in the form of list entries of attributes 41 in step S2, and are integrated individually, as a function of the access rights to be provided to the applicable developers 30, into the secret key 21 generated in step S3. In practice, however, it sometimes happens that there is a need to assign additional access rights after the fact to a developer 30 who is already in possession of a secret key 21. The secret key 21 initially generated in step S3 must then be extended by additional access rights; the relevant developer 30 thus requires a suitably extended secret key 37 (skey'). The extension of the secret key 21 by additional access rights is coordinated by the central instance 10, because the individual developers 30 do not have any possibility of autonomously changing or extending the rights of their secret keys 21. In particular, the secret keys 21 are generated such that it is not possible for the developers 30 to combine two existing secret keys 21 and their access rights.

If a developer 30 needs additional access rights to components 40 or component groups 42 of the software model 16, in step S8 the central instance first generates an appropriately extended decryption structure (dstr'). The extended decryption structure can either be based on the decryption structure 17 already generated in step S2, or can be generated from scratch independently thereof [dstrgen=dstr']. In this process, only the access rights specified by the list entries are changed or extended, but the attribution of the software model 16 remains unchanged. In step S9 a key extension 23 (ext) is then generated that relates to the particular access rights that are provided [extkey(dstr')=ext] by the extended decryption structure (dstr').

The key extensions 23 can be generated by the KEYGEN module 13 in the same manner as the secret keys 21. By the same token, however, a separate EXTKEY module can also be provided in the central instance 10 for this purpose, since the secret keys 21 and the key extensions 23 are generated using different methods. This is already apparent from the fact that the key extension 23 is not an independent secret key and in this regard cannot readily be used to decrypt an encrypted software model 22, 24. Nor is the attribution of the components 40 of the software model 16 changed for the key extension 23. Instead, the key extension 23 merely transports the additional access rights based on the existing attribute assignment and must be suitably linked with an already existing secret key 21 in order for the additional access rights to transfer to the original secret key 21. Once the key extension 23 has been transferred to the developer 30 in step S10, then in step S13 the developer combines the key extension 23 with the original secret key 21 [mergekey(skey, ext)=skey'] and generates an extended secret key 37 (skey'). The combination of the key extension 23 with the corresponding secret key 21 is carried out via the MERGE module 34.

If the extended access rights of the extended secret key 37 do not require the software model 16 to be encrypted again, an encrypted software model 22 that the developer 30 has already received can be decrypted again in step S14 in order to decrypt the additional components 40 or component groups 42. In the case shown in FIG. 2, in which the access rights that are additionally to be granted to the developer 30 were not already stored in the original decryption structure 17 in step S2, for example because the additional component group 42 in question had not yet been provided at that point, the central instance 10 re-encrypts the software model 16 in step S11 with the central public key 19 and the extended decryption structure (dstr') in order to thus generate [enc (mod, pkey, dstr')=emod'] a modified encrypted software model 24 (emod') and transmit it to the developer 30 in step S12.

It should be understood that the specific sequence of the steps in FIG. 2 is strictly an example, because any other desired sequence of the steps that achieves the purpose of the invention is likewise included in the invention. Thus, for instance, the steps S3 to S6 can be executed in a different order since it is immaterial to the purpose of the invention whether it is the secret key 21 that is generated and transmitted first, or the encrypted software model 22. In particular, the secret key 21 and the encrypted software model 22 can also be transmitted to the developer 30 in one common step. The same also applies to the steps S9 to S12 and the methods in FIGS. 4, 5, and 7, for example.

In an exemplary embodiment of the present invention, the method described in connection with FIGS. 1 and 2 is applied to the encryption of technical systems that relate to a virtual control unit and/or a device or system to be controlled or regulated, for example a motor vehicle engine or the like. The corresponding software model 16 can be formed of multiple components 40, which are hierarchically structured, for example in the form of a tree structure or a directed graph. The invention is not limited to such structured software models 16, however, but instead is equally applicable to any desired component-based software model 16 in which the individual components 40 stand in technical, organizational, or other relation to one another. In this context, the components 40 represent specific code sequences, program modules, program models, or descriptions of the modeled technical system, such as in the form of XML files or the like. In the case of a software model 16 of a control unit and/or technical device or system to be controlled or regulated when the model is structured hierarchically by component, each component 40 can contain one or more sub-components, wherein there is one root component that represents the entire modeled technical system or the entire modeled control unit. With the exception of the root component, each and every other software component is part of exactly one additional, higher-level software component.

FIGS. 4 to 7 show exemplary tree structures of a software model 16 organized by component, wherein the component labeled K0 in FIGS. 4 and 5 concerns a virtual control unit, the components 40 labeled K1 and K2 relate to modules of this virtual control unit, and the components 40 labeled K3 and K4 in turn relate to sub-modules or software parts of the software component K2. The individual software components 40 here either have a strictly software-architectural nature or represent independently usable or technically completed parts of the technical system to be modeled, which may if applicable be independently executable or usable.

In this context, FIG. 3 shows the test environment 102 of an HIL simulator with various software models 108 of a virtual technical device or system to be controlled by a real control unit 120. The reference number 104 identifies input/output interfaces of the test environment 102 for connection to the real control unit 120 through interface cables 122. The reference number 106 identifies input/output functions of the test environment 102, which are linked by connections between the interface 104 and the various software models 108, and convert or transform signals that are directed to the software models 108 by the real control unit 120 and vice versa. With the exemplary arrangement from FIG. 3, the functionality of the real control unit 120 is tested on the basis of the interaction with the various software models 108. On the other hand, the software models 108 are further developed such that they react appropriately to the control of the control unit 120. Thus, simulation is used here to test whether the control unit 120 behaves as desired and controls the various software models 108 of the technical system to be controlled or regulated as desired.

Conversely, it is also possible that a software model 108 is modeling a control unit and that a real system to be controlled is connected through the cables 122 to the test environment 102. It is likewise possible that both the control unit and the system to be controlled are stored in the test environment 102 in the form of software models 108 in order to test the entire technical system in an early stage of development. In order to discover flaws in the interaction of various control units, it is also possible to use the test environment 102 to carry out integration tests, in which multiple control units 120 are connected to an HIL simulator and are tested simultaneously. At least one of these multiple control units is then typically present in the form of a software model 108.

While the arrangement in FIG. 3 represents a typical HIL simulator, in which a single control unit 120 is subjected to a real-time simulation, the reverse case, in which a single control unit is present as a software model 108, represents a typical RCP test environment. In addition to the scenario alluded to above of an HIL simulator with multiple control units 120 connected thereto, at least one of which control units is present as a software model 108, the RCP test scenario offers another possibility for testing a control unit 120 present as a software model 108.

In each case, the technical system to be controlled or regulated can be any desired technical device or system, even another existing control unit, which in turn is connected to a technical system to be controlled and on which control functionalities can be tested or further developed in the test environment 102. In connection with the present invention, the software models 108 are encrypted by the central instance 10 and transmitted to the developers 30 for further development there.

FIG. 4 illustrates the methods according to the invention via a hierarchically organized software model 16 with software components 40, which are represented as rectangles that form a graph, and are labeled K0 to K4.

Based on the method from FIG. 2, an initialization process is carried out (setup) in step S100 of FIG. 4, with the master key and the central public key 19 being created as part of the process. As part of the initialization, the decryption structure 17 is also generated, which comprises, firstly, the attribute assignment of the software model 16 (left-hand side of the box 17) and based thereon, secondly, the access rights in the form of list entries (right-hand side of the box 17), which define the component groups 42 that the developers 30 should be able to decrypt via individual secret keys 21. The initialization steps S1 in FIG. 2 and S100 in FIG. 4 need not be executed again for every additional software model 16 to be encrypted, since the master key and the public key 19 generally can be reused, even if other components 40 and component groups 42 or attributes 41 are defined or used.

The attribution assigns one or more of the attributes A, B, and C to each of the components K0 to K4. The attributes ABC are assigned to the root component K0, the attributes A and BC to the two components K1 and K2 therebelow of the first hierarchy level, and the attributes B and C to the two components K3 and K4 of the second hierarchy level. This attribution achieves simple grouping of the components 40 into component groups 42 that the developers 30 are granted access rights to work with via the list. The list, in turn, has three entries, namely one entry with the attribute A, one with the attribute B, and one with the attribute C. Each of the entries defines a component group 42, namely the group whose components 40 carry at least the attribute 41 specified in each case.

As described in connection with FIG. 2, the individual secret keys 21 each contain at least one part of the decryption structure 17, namely precisely the specific part that enables the applicable secret key 21 to decrypt precisely the specific components 40 that correspond to the applicable definition. In the exemplary embodiment from FIG. 4, these are the particular list entries that enable the corresponding secret key 21 to decrypt the component group 42 designated by the central instance 10.

After the encryption of the software model 16 in step S200 (enc), in step S300 three secret keys 21 for three respective different developers 30 are generated (keygen), wherein one of the secret keys 21 carries the list entry with the attribute A, so that the component group 42 including the particular components 40 that carry at least the attribute A can be decrypted with this key. Two additional secret keys 21 carry the list entries with the attribute B and the attribute C. The central instance 10 has complete control over which software components 40 are combined into a component group 42 and released to an authorized developer 30 for decryption. For this reason, the decryption structure 17 is also at least partially integrated into the encrypted software model 22 so that matching can later take place to determine whether a particular secret key 21 is authorized to decrypt a particular component group 42. In the exemplary embodiment from FIG. 4, this is the attribution of the components 40. Lastly, in step S400 the generated secret keys 21 are transmitted to the respective developers X1, X2, and X3 along with the encrypted software model 22.

The steps described make it evident that a part of the decryption structure 17 is integrated into the encrypted software model 22, which is to say the attribution in FIG. 4, and another part is integrated into the secret keys 21, which is to say the list entries that define the decryptable component groups 42 in FIG. 4. Both parts are necessary for decryption, which is to say the complete decryption structure 17, with the exact opposite being possible in a departure from the key policy (KP) used in FIGS. 2 and 4, namely that the attribution and the list entries can also be integrated into the encrypted software model 22 and the secret keys 32 according to a cipher text policy (CP). The embodiments from FIGS. 2 and 4 can also be modified according to a cipher text policy without it being necessary to depart from the essence of the invention.

In step S500, each of the three developers 30 decrypts the encrypted software model 22 with the individual secret key 21 assigned to him, so that different component groups 42 are decrypted (dec) in each case, depending on which list entries the relevant secret key 21 carries. The developer X1 can only decrypt the particular component group 42 whose components 40 carry at least the attribute A. Similarly, the developers X2 and X3 with their individual secret keys 21 can each decrypt only the particular component groups 42 whose components 40 carry at least the attribute B or the attribute C. The three different decrypted software models 35 thus have in decrypted form only the component group 42 predefined by the applicable secret key 21, while all other components 40 that do not carry the relevant attribute 41 remain encrypted. Thus, only the particular components 40 of the software model 16 that are defined by the secret key 21 are decrypted.

FIG. 5 shows by way of example a strategy for creating access rights via suitable attribute assignments. As a rule, there are some constraints in the attribution of the hierarchical software model 16; in particular it may be necessary to take into account that when a specific component 40 is to be decryptable for a developer 30, the corresponding higher-level component 40 thereof must also be decryptable for this developer 30. This is the case, for example, when a higher-level software component 40 is a folder and the subcomponents 40 below this folder represent files with program code. In this case, a lower-level file cannot be decrypted by a developer 30 if the folder in which this file is stored cannot also be decrypted.

Fundamentally, the strategy for generating a decryption structure 17 that defines the component groups 42 desired by the central instance 10 based on a suitable attribution includes two steps, namely first the definition of component groups 42 by technically useful or necessary combination of components 40, and subsequently the association of one or more attributes 41 with the individual components 40 of the software model 16 in such a manner that the previously defined component groups 42 can be uniquely described by these attributes 41, for example as list entries in the form of propositional expressions. The entries in the list of the decryption structure 17 then each uniquely describe a group of components 40 that a specific developer 30 should, or for technical reasons must, be authorized to access as a group. Other list entries can grant the same developer 30 access rights to additional component groups 42.

To this end, for each individual software component 40, the central instance 10 first analyzes the lower-level components 40 below that component, and on the basis of technical, security-relevant, organizational, or other relevant criteria, decides which components 40 of the hierarchical software model 16 should be combined into component groups 42. A component group 42 comprises, for example, the particular software components 40 that must always be worked on as a group by a developer 30, along with the components 40 dependent on these components. Once all component groups 42 have been defined in this manner, attributes 41 can be assigned to the individual components 40 such that, in the simplest case, the components 40 of a component group 42 have at least one matching attribute 41 that the components 40 of all the other component groups 42 do not have. In more complex terms, a component group 42 can also be uniquely described in that its components 40 have a specific combination of attributes 41 that no other component 40 has that should not be part of this component group 42.

In general, the attributes 40 can be linked with propositional operators, as for example AND, OR, XOR (exclusive OR), or NOT. A component group 42 is then composed of the particular components 40 whose attributes 41 yield a true proposition according to a predetermined propositional operation, which is to say the group is composed of the particular components 40 whose attributes 41 fulfill this proposition. For example, one component group 42 can comprise all components 40 that have the attribute A, and another component group 42 can comprise the particular components 40 that have the attribute B. A third component group 42 can then comprise, for example, all those components 40 that have either the attribute A or the attribute B, or in other words all the components 40 for which the proposition "A OR B" is true.

In the exemplary embodiment from FIG. 5, a component group 42 within the decryption structure 17 is defined in that the components 40 that belong to the relevant component group 42 are exactly those that have at least one attribute specified for the purpose of defining the component group 42 or that have at least the attribute combination specified for this purpose.

The hierarchical software model 16 from FIG. 5a comprises a root component K0, which represents a virtual control unit, as well as sub-components K1 to K4, which model individual technical components of this virtual control unit. Different attribute combinations that has one or more of the individual attributes A, B, C, D, E, or F are assigned to each of the components K0 to K4. It is evident from the tree structure that defining a component group 42 by the attribute A groups the components K0 and K1, namely the components 40 whose attributes 41 have at least the attribute A. Thus a component 40 that also includes additional attributes 41 besides the attribute A is likewise part of the component group 42 defined by the attribute A. Accordingly, the component group 42 defined by the attribute B formed of the components K0, K1, and K2, the component group 42 defined by the attribute D formed of the components K2 and K3, and the component group 42 defined by the attribute F formed of the component K4.

FIG. 5b shows different component groups 42 that are defined by list entries of a decryption structure 17, and can be decrypted by four different developers 30 (X1, X2, X3, X4) via their individual secret keys 21. The four specified attribute combinations (A, D), (B, F), (BC), and (BCD) represent list entries of the decryption structure 17 for the software model 16, which have been integrated into the secret keys 21 for the developers X1, X2, X3, and X4. Here, the attribute combinations (A, D) and (B, F) each define two component groups 42, while the attribute combinations (BC) and (BCD) linked by an AND operation each define one component group 42. From the complete list of the decryption structure [(A, D), (B, F), (BC), (BCD)], therefore, during generation of the secret keys 21 for the applicable developers 30 only the particular list entries to whose component groups 42 the developer 30 in question is supposed to have access are included in the applicable secret key 21.

FIG. 5 illustrates once again the two parts of the decryption structure 17 from FIG. 4 in accordance with a key policy, namely the attribution of the individual components 40 (FIG. 5a) integrated into the software model 16 on the one hand, and the list entries integrated into the applicable secret keys 23 (FIG. 5b) [on the other hand].

In the example from FIG. 5b, the developer X1 accordingly has access to two component groups 42, namely to the group that is defined by the single attribute A and formed of the components K0 and K1, and the group that is defined by the single attribute D and formed of the components K2 and K3. Similarly, the developer X2 has access to the two component groups 42 that are each defined by the single attributes B and F. The developers X3 and X4 each have access to only one component group 42, wherein the specified attribute combinations (BC) and (BCD) designate the particular components 40 that have at least these attribute combinations. It is apparent that the two developers X3 and X4 only have access to the component K2, since the attributes 40 of the component K2 include both the attribute combination (BC) and the attribute combination (BCD).

A decryption structure 17 of this nature is referred to as "monotonic" because the decryption of a corresponding component 40 is allowed simply if this component 40 includes at least the attributes that are specified by the corresponding entry in the list of the decryption structure 17. The rule for the definition of component groups 42 here is that, on the one hand, a component 40 must have all the attributes 41 of a definition of a list entry in order to belong to a component group 42, but on the other hand it may also have more attributes 41.

As an alternative to this AND rule, an OR rule can also be used which then states that a component 40 only has to have one of the attributes 41 that a definition of a list entry of the decryption structure 17 specifies. Accordingly, an example of an OR rule based on the software model 16 from FIG. 5a would be that the attribute combination (AF) defines the component group 42 formed of the components K0, K1, and K4, since these components have either the attribute A or the attribute F.

As already discussed, component groups 42 can in general be defined via logical propositions such that it is also possible to link the attributes 41 of a component 40 by relatively complex propositions having different logical operators, and to assign this component 40 to the applicable component group 42 if this proposition is true. Against the background of the notation used in FIG. 5b, a list entry (AB) can thus be interpreted as the proposition "A AND B," and the list entries (A, B) as the proposition "A OR B." The list entries (AB, C) thus represent the proposition "(A AND B) OR C," which combines into one component group 42 all components 40 that either have both attributes A and B or have the attribute C. The propositional expression "NOT A XOR B," for example, would accordingly group the components K0, K1, K3, K4 into one component group 42, because these components either possess both the attributes A and B, or neither of these attributes.

FIG. 6 illustrates an exemplary embodiment of the present invention in conjunction with especially complex hierarchical structures of the software model 16. In extensive component hierarchies, the components 40 located close to the root component frequently are trivial components 40, which do not carry any sensitive or technically relevant data or information, but instead merely serve to structure lower-level, technically relevant components 40. Folders whose lower-level components 40 provide the actual functions or function libraries in the form of files are examples of trivial components 40 of this nature. Such trivial components 40 are characterized in that on the one hand they carry absolutely no technically relevant information, but on the other hand the developers 30 must be able to decrypt them in order to obtain access to the technically relevant, subordinate components. The component structure in FIG. 6 shows two trivial components above the dashed line, namely the root component K0, which represents a folder that contains the entire modeled technical system, and the component K1, which represents a folder with technically relevant components.

The central instance 10 can easily identify trivial components manually or even automatically. The remaining components, which is to say the ones below the dashed line in FIG. 6, then form multiple subtrees T1, T2, T3, and T4, which are given attributes 41 separately and independently of one another. A separate decryption structure 17 is generated for each subtree, since it is useful because of the complexity of the software model 16 to provide the subtrees with attributes separately from one another, and also to construct separate decryption structures 17. However, the access rights of a single developer 30 can relate to different subtrees here, in that his secret key 21 has definitions from multiple decryption structures 17.

During creation of attribute assignments and decryption structures 17 for the subtrees T1 to T4, the trivial components K0 and K1 are taken into consideration such that they can be decrypted by every developer, for example in that an attribute is assigned to all trivial components that subsequently can be decrypted with every secret key 21. Accordingly, the root component K0 carries all attributes (ABCD) that occur, so that every definition that places one of the subtrees T1, T2, T3, and T4 in a component group also includes the root component K0. The component K1 carries only the attributes of the subtrees T1 and T2 (AB), so that on the one hand, every definition that places one of the subtrees T1 or T2 in a component group also includes the trivial component K1. On the other hand, however, a definition that places one of the subtrees T3 and T4 in a component group does not include the trivial component K1. It is possible to not only handle trivial components in this manner, but also essential components, which is to say components 40 that carry data and information of such importance that each developer 30 must have access to them.

This identification of trivial and essential components, and the separate attribution of the subtrees resulting therefrom, can be applied to all software models 16 that are hierarchically structured, in particular to software models 16 of control units and/or devices or systems to be controlled that are modeled in conformity with the AUTOSAR standard. In this context, folders, ARXML files, and ARPackages, for example, are considered trivial components, which merely contain or point to other components. The resultant subtrees can in turn be interpreted as standalone software models 16, each of which is located in an ARPackage. In connection with the AUTOSAR standard, for example, "data types" and "data type properties," "port interfaces," "software components," and "implementations" can be modeled as subtrees and in this regard as standalone software models. Such AUTOSAR software objects can be attributed autonomously and using suitable strategies, separately from the rest of the software model 16. For example, "data types," together with the corresponding "data type properties," are considered as one related component in each case. In like manner, component groups that include all the pertinent variables or functions can be created for "port interfaces," or "port interfaces" or "data types" can be combined into relatively large component groups. Moreover, "software components" can form component groups together with the corresponding "ports" or other software elements (such as "internal behaviors"). In the case of so-called "implementations," the implemented functions can be grouped in the form of component groups. Since "implementations" implement certain tasks, for example in the form of source code or object code, which may be associated with different platforms, "implementations" that are implemented for a specific platform or that fulfill a specific shared task can form a component group.

Finally, an especially preferred embodiment of the invention that concerns the extension of the decryption rights of secret keys 21 which have already been issued, such as has already been explained with reference to steps S8 to S14 from FIG. 2, is described in connection with FIG. 7.

In order to extend the rights of developers 30 to allow them to access an encrypted software model 22 that is already present for them, it is necessary to extend the access rights connected to the applicable secret key 21, which is to say the list entries integrated from the decryption structure 17, in such a manner that the developer 30 can decrypt one or more additional component groups 42. Two additional methods or algorithms are used for this purpose, namely firstly the EXTKEY method for generation of a key extension 23, and secondly the MERGEKEY method for extending an already existing secret key 21 by the rights of the key extension 23. In keeping with the arrangement from FIG. 1, the EXTKEY method is implemented by KEYGEN module 13 of the central instance 10, and the MERGEKEY method is implemented by a separate MERGE module 34 on the part of the developer 30.

As the starting point for this embodiment at the start of step S600 in FIG. 7, the developer 30 has received his secret key 21 and a decrypted software model 35 in which the component group 42 defined by the attribute A is decrypted, while all other component groups 42 of the underlying model 22 are encrypted. The developer 30 now needs access to, for example, the additional component group 42, which is defined by the attribute B.

The method in FIG. 7 makes it possible for the developer 30 (X1) to decrypt this additional component group 42 as well, without it being necessary for the central instance 10 (Z) to generate an additional individual secret key 21 for the developer 30 and deliver it to the developer 30. This scenario occurs, for example, when a developer 30 receives an additional or extended development task from the central instance 10 concerning the development of additional component groups 42 that were not hitherto accessible to him. This is the case, for example, when the responsibility for a certain component group 42 is supposed to pass from one developer 30 to another developer 30, or when an additional component group 42 has been added to the applicable software model 16 during the course of its development which the developer 30 (X1) is now supposed to work on. In the first case mentioned, it is sufficient to extend the secret key 21 of the developer 30 by the definition of the new component group 42, but in the second case, namely the addition of an entirely new component group 42 to the software model 16, it is additionally necessary for the central instance 10 to generate a correspondingly extended new decryption structure 17 and to transmit the extended and re-encrypted software model 16 to the developers 30.

In step S600, the developer 30 puts in a request with the central instance 10 for an extension of his secret key 21. In step S700, the central instance 10 carries out the EXTKEY method and generates the key extension 23 using the master key, an item of information about the secret key 21 to be extended of the developer 30, and an extended decryption structure (extkey). The key extension 23 is matched here to the secret key 21 to be extended, and can only be used by a developer 30 if he has received the corresponding secret key 21. The key extension 23 thus is not a standalone secret key, but rather merely a data structure that comprises the definition of a component group 42 of the software model 16 that was not hitherto accessible for the developer 30, or in other words, in the example from FIG. 7 this is the particular component group 42 defined by the attribute B.

Once the central instance 10 has provided the key extension 23 to the developer 30, in step S800 the developer 30 carries out the MERGEKEY method with the input of the previous secret key 21 and the received key extension 23 (mergekey). In this way the extended secret key 37 is generated, which now carries not only the definitions of the component group 42 characterized by the attribute A but also the definitions of the component group 42 characterized by the attribute B, which is to say the attributes (A, B). Next, in step S900 the developer 30 decrypts the encrypted software model 22 already in his possession with the extended secret key 37 (dec), in this way decrypting not only the component group 42 defined by the attribute A but also the component group 42 of the software model 16 that is defined by the attribute B.

Since the key extension 23 is not a standalone secret key 21, but instead can only be used to extend an already existing secret key 21, the key extension 23 does not necessarily have to be transmitted to the developer 30 through a secure communications channel in step S700, as is necessary for the transmission of the associated secret key 21, for example as in step S4 of FIG. 2 or as in step S400 of FIG. 4. The key extension 23 is worthless without the associated secret key 21. For this reason, the central instance 10 also does not necessarily have to check in step S600 whether the developer 30, from whom the relevant request for extension of his secret key 21 comes, is in fact authorized to decrypt the additional component group 42. Instead, the central instance 10 can independently decide during generation of the key extension 23 in step S700 whether the previously generated secret key 21 should be extended by the requested access rights.

The check on the part of the developer 30 as to whether the key extension 23 is meant for the secret key 21 can either take place during generation of the extended secret key 37 in step S800 (mergekey) or later during use of the extended secret key 37 in step S900 (dec). In order to make such a check possible, the secret key 21 and the key extension 23 both contain a special identifier, which are checked for agreement or correspondence, either in step S800 or not until step S900. This identifier directly or indirectly identifies the applicable secret key 21, and its presence in the key extension 23 specifies the particular secret key 21 for which the key extension 23 is intended.

If this check takes place as early as during generation of the extended secret key 37 in step S800 (mergekey), then the extended secret key 37 is only generated if the identifiers of the secret key 21 and the key extension 23 correspond to one another. Alternatively, and preferably, the secret key 21 and the key extension 23 are merged with one another in step S800 but without additional checking, and it is not until during decryption of an encrypted software model 22 in step S900 (dec) that a check is made as to whether their identifiers correspond. If it is established in step S900 that the identifiers correspond, then all component groups 42 whose definitions were integrated either into the original secret key 21 or into the key extension 23 are decrypted. If the identifiers do not correspond, either the encryption is aborted because sufficient authorization is not present, or only the component groups 42 that could already be decrypted with the original secret key 21 continue to be decrypted.

The identifiers can be designed and structured in a variety of ways, for example as a random number or hash value, or can also carry additional information, for example about the developer, the secret key, or the additional component group which the developer is additionally supposed to be authorized to decrypt. Fundamentally, it is not necessary that the identifiers of the key extension 23 and of the secret key 21 be identical, but only verifiable, which is to say they can be compared via a suitable algorithm. Also, the identifier can additionally be integrated into the encrypted software model 22, for example in such a manner that each component 40 carries at least a part of the identifier. In this case, a component group 42 can only be decrypted in step S900 if all components 40 of this component group 42 carry at least parts of the identifier of the secret key 21 employed.

The method in FIG. 7 thus makes it possible to extend the access authorizations of a secret key 21 without necessitating modification of the encrypted software model 22 as long as the definitions of the key extension 23 are already present in the original decryption structure 17, and hence in the encrypted software model 22. If an entirely new component group 42 of the software model 16 has been defined whose definition the key extension 23 carries, the software model 16 must be encrypted again with a corresponding new or extended decryption structure 17 and delivered to the developers.

In an exemplary embodiment, a method for encrypting a software model, comprises software components in a hierarchical relationship to one another, of a control unit and/or a system controlled or regulated by a control unit, comprising the steps: generation (S1; S100) of a public key (19) and a master key; Generation (S2) of a decryption structure (17) by assigning attributes (41) to the software components (40) in such a manner that the attributes (41) reproduce the hierarchical relationship of the software components (40), and definition of at least one component group (42) from those software components (40) to which at least one specific attribute (41) was assigned in such a manner that the decryption structure (17) includes at least one definition of a component group (42) of software components (40) of the software model (16); Generation (S3; S300) of at least one secret key (21) via the master key and the decryption structure (17) in that the at least one specific attribute (41) is integrated into the secret key (21) in such a manner that the secret key (21) includes the definition of the at least one component group (42); and at least partial encryption (S5; S200) of the software model (16) via the public key (19), wherein the decryption structure (17) is at least partially integrated into the encrypted software model (22) in such a manner that the at least one component group (42) can only be decrypted via the secret key (21).

The attributes (41) can be assigned to the software components (40) in such a manner that each software component (40) possesses at least one attribute (41) in common with a hierarchically higher-level software component (40).

The decryption structure (17) can be generated (S2) in such a manner that a component group (42) also includes a hierarchically higher-level software component (40) for each software component (40).

The decryption structure (17) can be generated (S2) in such a manner that the at least one component group (42) forms an autonomous part of the software model (16).

The software model (16) comprises trivial software components (40) and/or essential software components (40), wherein the decryption structure (17) is generated (S2) such that the at least one component group (42) includes all trivial software components (40) and/or all essential software components (40).

The software components (40) can be generated in conformity with the AUTOSAR standard.

The software model (16) can be encrypted in conformity with an attribute-based encryption method.

The software components (40) can be encrypted individually.

The decryption structure (17) can be generated as a list, wherein each list entry in the list defines a component group (42) by at least one attribute (41).

Furthermore, the method can further comprising the steps of: generation (S8) of an additional decryption structure (17) that defines at least one additional component group (42) of software components (40) of the software model (16), wherein the at least one additional component group (42) is defined from the particular software components (40) to which at least one specific additional attribute has been assigned; and generation (S9; S700) of a key extension (23) for the at least one secret key (21) via the master key and the additional decryption structure, in that the at least one additional specific attribute (41) is integrated into the key extension (23) in such a manner that the key extension (23)

includes the definition of the at least one additional component group (42), and the at least one additional component group (42) can only be decrypted by an extended secret key (37) that is composed of the secret key (21) and the key extension (23).

An identifier of the secret key (21) can be integrated into the key extension (23) during generation (S9; S700) of the key extension (23).

A check can be made as to whether at least the at least one predefined attribute (41) that is integrated into the secret key (21) has been assigned to a software component (40) of the encrypted software model (22), and the at least one component group (42) is only decrypted (S7; S500) if the decryption structure (17) at least partially integrated into the encrypted software model (22) defines the at least one component group (42) and the secret key (21) includes the definition of the at least one component group (42).

The decryption structure (17) can be present as a list with list entries, which in each case defines one component group (42) by at least one attribute (41), wherein the component group (42) is only decrypted (S7; S500) if the applicable list entry includes, at a minimum, the at least one attribute (41) assigned to the component group (42).

An extended secret key (37) can be formed (S13; S800) from the secret key (21) and the key extension (23) generated with a method from paragraph 10 or 11, in that the at least one specific additional attribute (41) is integrated into the secret key (21), wherein the definition of the at least one additional component group (42) is integrated into the secret key (21) in such a manner that the at least one additional component group (42) can be decrypted via the extended secret key (37) if a decryption structure (17) at least partially integrated into the encrypted software model (22; 24) defines the at least one additional component group (42).

An identifier of the key extension (23) and an identifier of the secret key (21) can be integrated into the extended secret key (37) during formation (S13; S800) of the extended secret key (37), wherein the at least one component group (42) is only decrypted (S14; S900) via the extended secret key (37) if the identifier of the key extension (23) and the identifier of the secret key (21) correspond to one another.

Also, an electronic data set (22; 24) can include a software model (16) that comprises software components (40) which are in hierarchical relationship with one another and that is encrypted using the exemplary method, and also comprises a decryption structure (17) that defines at least one component group (42) of software components (40) of the software model (16), wherein the data set (22; 24) is designed such that the encrypted software model (22) can be decrypted using a method according to one of paragraphs 12 to 15.

The decryption structure (17) can be designed as a list with list entries, each of which entries defines one component group (42) by at least one attribute (41).

Further, an encryption unit (11) for encrypting a software model (16), can include software components (40) that are in hierarchical relationship with one another, of a control unit and/or of a system controlled or regulated by a control unit, and can include: a SETUP initialization module (12), which is configured to generate (S1; S100) a public key (19) and a master key, as well as to generate (S2) a decryption structure (17) by assigning attributes (41) to the software components (40) in such a manner that the attributes (41) reproduce the hierarchical relationship of the software components (40), and by defining at least one component group (42) from those software components (40) to which at least one specific attribute (41) was assigned in such a manner that the decryption structure (17) includes at least one definition of a component group (42) of software components (40) of the software model (16); a KEYGEN key generation module (13), which is configured to generate (S3; S300) at least one secret key (21) via the master key and the decryption structure (17), in that the at least one specific attribute (41) is integrated into the secret key (21) in such a manner that the secret key (21) includes the definition of the at least one component group (42); as well as an ENC encryption module (14), which is configured to at least partially encrypt (S5; S200) the software model (16) via the public key (19), wherein the decryption structure (17) is at least partially integrated into the encrypted software model (22) in such a manner that the at least one component group (42) can only be decrypted via the secret key (21).

The encryption unit (11) can be configured to encrypt a software model (16) comprising software components (40) using the exemplary method.

In a further exemplary embodiment, a decryption unit (31) is provided for decrypting, via the secret key (21), a software model (16) encrypted using the exemplary method, the unit comprising a DEC decryption module (33), which is configured to check whether at least the at least one predefined attribute (41) integrated into the secret key (21) was assigned to a software component (40) of the encrypted software model (22), and to only decrypt (S7; S500) the at least one component group (42) if the decryption structure (17) at least partially integrated into the encrypted software model (22) defines the at least one component group (42) and the secret key (21) includes the definition of the at least one component group (42).

The decryption unit (31) can be configured to decrypt an encrypted software model (22) comprising software components (40) using the exemplary method.

The modules (12, 13, 14, 33) can be implemented as software modules or software programs.

A development environment (10, 30) for developing a software model (16) is also provided that includes software components (40) that are in hierarchical relationship with one another, comprises the encryption unit (11) and/or the decryption unit (31).

Further, the encryption unit (11) for encrypting a software model (16), comprises software components (40), of a technical system, in particular of a control unit and/or of a device controlled by a control unit, an includes: a SETUP initialization module (12), which is configured to generate (S1; S100) a public key (19) and a master key and to generate a decryption structure (17) that includes at least one definition of a component group (42) of software components (40) of the software model (16); and an ENC encryption module (14), which is configured to at least partially encrypt (S5; S200) the software model (16) via the public key (19) and the decryption structure (17), wherein the decryption structure (17) is at least partially integrated into the encrypted software model (22) in such a manner that the at least one component group (42) can only be decrypted via a secret key (21) that includes the definition of the at least one component group (42).

A KEYGEN key generation module (13) can be configured to generate (S3; S300) the at least one secret key (21) via the master key and the decryption structure (17) in such a manner that the secret key (21) includes the definition of the at least one component group (42).

The SETUP initialization module (12) can be configured to generate (S8) an additional decryption structure (17) that defines at least one additional component group (42) of software components (40) of the software model (16); and the KEYGEN key generation module (13) can be configured to generate (S9; S700) a key extension (23) for the at least one secret key (21) via the master key and the additional decryption structure in such a manner that the key extension (23) includes the definition of the at least one additional component group (42).

A DEC decryption module (33) can also be provided, which can be configured to only decrypt (S7; S500) the at least one component group (42) if the decryption structure (17) at least partially integrated into the encrypted software model (22) defines the at least one component group (42), and the secret key (21) includes the definition of the at least one component group (42).

A MERGEKEY key generation module (34) can be provided, which can be configured to form (S13; S800) an extended secret key (37) from the secret key (21) and a key extension (23) generated by the encryption unit, in that the definition of the at least one additional component group (42) is integrated into the secret key (21) in such a manner that the at least one additional component group (42) can be decrypted via the extended secret key (37) if a decryption structure (17) at least partially integrated into the encrypted software model (22; 24) defines the at least one additional component group (42).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An encryption method for encrypting a software model having software components of a technical system, a control unit or a system controlled or regulated by the control unit, the encryption method comprising:
   generating, by a processor, a public key and a master key;
   generating, by the processor, a decryption structure that includes a definition of at least two component groups of the software components of the software model for decryption by at least two devices, the at least two component groups structuring different functional parts of the software model to perform a task when respectively decrypted by the at least two devices;
   at least partially encrypting, by the processor, the at least two component groups of the software components of the software model via the public key as specified by the decryption structure;
   at least partially integrating, by the processor, the decryption structure into the encrypted software model; and
   generating, by the processor, at least two secret keys via the master key by respectively including therein the definition of the at least two component groups of the software components of the software model such that when the encrypted software model is distributed to each of at least two devices having respective secret keys that each include the definition of a corresponding component group of the software components of the software model, the at least two component groups are only individually decryptable via the respective secret keys,
   wherein each of the at least two secret keys is distinct from each other, and
   wherein the decryption structure is generated by assigning attributes to the software components and defining the at least two component groups from those software components to which at least one specific attribute was assigned.

2. The encryption method according to claim 1, wherein the software components within the software model are in hierarchical relationship one another, and
   wherein attributes are assigned to the software components such that each software component possesses at least one attribute in common with a hierarchically higher-level software component.

3. The encryption method according to claim 1, wherein the software components within the software model are in hierarchical relationship with one another, and
   wherein the decryption structure is generated such that a component group also includes a hierarchically higher-level software component for each software component.

4. The encryption method according to claim 1, wherein the decryption structure is generated such that the at least two component groups form an autonomous part of the software model.

5. The encryption method according to claim 1, wherein the software model comprises at least one of trivial software components or essential software components, and
   wherein the decryption structure is generated such that the at least two component groups include at least one of all trivial software components or all essential software components.

6. The encryption method according to claim 1, wherein the at least one specific attribute is integrated into the at least two secret keys during generation of the secret keys.

7. The encryption method according to claim 1, further comprising:
   generating an additional decryption structure that defines at least one additional component group of software components of the software model; and
   generating a key extension for the at least two secret keys via the master key and the additional decryption structure such that the key extension includes the definition of the at least one additional component group.

8. The encryption method according to claim 7, wherein the additional decryption structure is generated by defining at least one additional component group from the software components to which at least one specific additional attribute has been assigned, and
   wherein the at least one additional specific attribute is integrated into the key extension during generation of the key extension.

9. The encryption method according to claim 7, wherein an identifier of the at least two secret keys is integrated into the key extension during generation of the key extension.

10. The encryption method according to claim 7, wherein the key extension is generated such that the at least one additional component group is only decryptable by an extended secret key that is composed of the at least two secret keys and the key extension.

11. A decryption method for decrypting a software model comprising software components of a technical system, a control unit or a system controlled or regulated by the control unit, the decryption method comprising:
   decrypting, by a processor of a decryption unit, the software model encrypted at an encryption using an encryption method that comprises:
      generating, by a processor of the encryption unit, a public key and a master key;
      generating, by the processor of the encryption unit, a decryption structure that includes a definition of at least two component groups of the software components of the software model for decryption by at least two devices, the at least two component groups structuring different functional parts of the software model to perform a task when respectively decrypted by the at least two devices;

at least partially encrypting, by the processor of the encryption unit, the at least two component groups of the software components of the software model via the public key as specified by the decryption structure;

at least partially integrating, by the processor of the encryption unit, the decryption structure into the encrypted software model; and generating, by the processor of the encryption unit, at least two secret keys via the master key by respectively including therein the definition of the at least two component groups of the software components of the software model such that when the encrypted software model is distributed to each of at least two devices having respective secret keys that each include the definition of a corresponding component group of the software components of the software model, the at least two component groups are only individually decryptable via the respective secret keys, wherein each of the at least two secret keys is distinct from each other, wherein the decryption structure is generated by assigning attributes to the software components and defining the at least two component groups from those software components to which at least one specific attribute was assigned, and wherein in the decryption method, each of the at least two component groups is only decrypted when the decryption structure at least partially integrated into the encrypted software model defines the each of the at least two component groups and the at least two secret keys include the definition of the each of the at least two component groups.

12. The decryption method according to claim 11, wherein, for the purpose of decrypting the encrypted software model by the at least two secret keys, a check is made as to whether at least the at least one predefined attribute that is integrated into the at least two secret keys is assigned to a software component of the encrypted software model.

13. The decryption method according to claim 11, wherein an extended secret key is formed from the at least two secret keys and a key extension generated for the at least two secret keys, and wherein the definition of the at least one additional component group is integrated into the at least two secret keys such that the at least one additional component group is decrypted via the extended secret key when a decryption structure at least partially integrated into the encrypted software model defines the at least one additional component group.

14. The decryption method according to claim 13, wherein the at least one additional specific attribute is integrated into the at least two secret keys when the extended secret key is formed.

15. The decryption method according to claim 13, wherein an identifier of the key extension and an identifier of the at least two secret keys are integrated into the extended secret key during formation of the extended secret key, and wherein the at least two component groups are only decrypted via the extended secret key when the identifier of the key extension and the identifier of the at least two secret keys correspond to one another.

16. A non-transitory computer readable medium storing an electronic data set comprising:

a software model that comprises software components of a technical system, a control unit or a system controlled or regulated by the control unit, the software model having been encrypted at an encryption unit using an encryption method that comprises:

generating, by a processor of the encryption unit, a public key and a master key;

generating, by the processor of the encryption unit, a decryption structure that includes a definition of at least two component groups of the software components of the software model for decryption by at least two devices, the at least two component groups structuring different functional parts of the software model to perform a task when respectively decrypted by the at least two devices;

at least partially encrypting, by the processor of the encryption unit, the at least two component groups of the software components of the software model via the public key as specified by the decryption structure;

at least partially integrating, by the processor of the encryption unit, the decryption structure into the encrypted software model; and generating, by the processor of the encryption unit, at least two secret keys via the master key by respectively including therein the definition of the at least two component groups of the software components of the software model such that when the encrypted software model is distributed to each of at least two devices having respective secret keys that each include the definition of a corresponding component group of the software components of the software model, the at least two component groups are only individually decryptable via the respective secret keys, wherein the data set is designed such that the encrypted software model is decryptable, wherein each of the at least two secret keys is distinct from each other, and wherein the decryption structure is generated by assigning attributes to the software components and defining the at least two component groups from those software components to which at least one specific attribute was assigned.

17. An encryption unit configured to encrypt a software model comprising software components of a technical system, a control unit or a system controlled or regulated by the control unit, the encryption unit comprising:

a processor; and a memory, wherein the processor and the memory are configured to:

generate a public key and a master key;

generate a decryption structure that includes a definition of at least two component groups of the software components of the software model for decryption by at least two devices, the at least two component groups structuring different functional parts of the software model to perform a task when respectively decrypted by the at least two devices;

at least partially encrypt the at least two component groups of the software components of the software model via the public key as specified by the decryption structure;

at least partially integrate the decryption structure into the encrypted software model; and generate at least two secret keys via the master key by respectively including therein the definition of the at least two component groups of the software components of the software model such that when the encrypted software model is distributed to each of at least two devices having respective secret keys that each include the definition of a corresponding component group of the software components of the software model, the at least two component groups are only individually decryptable via the respective secret keys, wherein each of the at least two secret keys is distinct from each other, and wherein the decryption structure is generated by assigning attributes to the software components and defining the at least two component groups from those software components to which at least one specific attribute was assigned.

18. A decryption unit configured to decrypt a software model comprising software components of a technical system, a control unit or a system controlled or regulated by the control unit, the decryption unit comprising:

a processor; and a memory, wherein the processor and the memory of the decryption unit are configured to decrypt the software model encrypted at an encryption using an encryption method that comprises:

generating, by a processor of the encryption unit, a public key and a master key;

generating, by the processor of the encryption unit, a decryption structure that includes a definition of at least two component groups of the software components of the software model for decryption by at least two devices, the at least two component groups structuring different functional parts of the software model to perform a task when respectively decrypted by the at least two devices;

at least partially encrypting, by the processor of the encryption unit, the at least two component groups of the software components of the software model via the public key as specified by the decryption structure;

at least partially integrating, by the processor of the encryption unit, the decryption structure into the encrypted software model; and generating, by the processor of the encryption unit, at least two secret keys via the master key by respectively including therein the definition of the at least two component groups of the software components of the software model such that when the encrypted software model is distributed to each of at least two devices having respective secret keys that each include the definition of a corresponding component group of the software components of the software model, the at least two component groups are only individually decryptable via the respective secret keys, wherein each of the at least two secret keys is distinct from each other, wherein the decryption structure is generated by assigning attributes to the software components and defining the at least two component groups from those software components to which at least one specific attribute was assigned, and wherein the processor and the memory of the decryption unit are configured such that each of the at least two component groups is only decrypted when the decryption structure at least partially integrated into the encrypted software model defines the each of the at least two component groups and the at least two secret keys include the definition of the each of the at least two component groups.

* * * * *